(12) United States Patent
Gondoh et al.

(10) Patent No.: US 9,244,423 B2
(45) Date of Patent: Jan. 26, 2016

(54) CLEANING BLADE, AND IMAGE FORMING APPARATUS AND PROCESS CARTRIDGE USING THE CLEANING BLADE

(71) Applicants: Masanobu Gondoh, Kanagawa (JP); Shohei Gohda, Kanagawa (JP); Kaori Toyama, Kanagawa (JP); Shinji Nohsho, Tokyo (JP); Masahiro Ohmori, Kanagawa (JP); Yohta Sakon, Kanagawa (JP); Hiromi Sakaguchi, Kanagawa (JP); Yuka Aoyama, Kanagawa (JP)

(72) Inventors: Masanobu Gondoh, Kanagawa (JP); Shohei Gohda, Kanagawa (JP); Kaori Toyama, Kanagawa (JP); Shinji Nohsho, Tokyo (JP); Masahiro Ohmori, Kanagawa (JP); Yohta Sakon, Kanagawa (JP); Hiromi Sakaguchi, Kanagawa (JP); Yuka Aoyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/625,826

(22) Filed: Feb. 19, 2015

(65) Prior Publication Data

US 2015/0261171 A1    Sep. 17, 2015

(30) Foreign Application Priority Data

Mar. 13, 2014    (JP) .................................. 2014-050409

(51) Int. Cl.
*G03G 21/00*    (2006.01)
*C08F 120/18*    (2006.01)

(52) U.S. Cl.
CPC .......... *G03G 21/0017* (2013.01); *C08F 120/18* (2013.01)

(58) Field of Classification Search
CPC .......... G03G 21/0011; G03G 21/0017; G03G 2221/0089
USPC .......................................................... 399/350
See application file for complete search history.

(56) References Cited

U.S. PATENT DOCUMENTS 3,848,992 A * 11/1974 Smith .......................... 399/350
4,957,839 A   9/1990 Rokutanzono et al.
5,008,172 A   4/1991 Rokutanzono et al.
(Continued)

FOREIGN PATENT DOCUMENTS

JP    H9-127846        5/1997
JP    11327395 A  *  11/1999
(Continued)

OTHER PUBLICATIONS

U.S. Appl. No. 14/323,018, filed Jul. 3, 2014.

*Primary Examiner* — Robert Beatty
(74) *Attorney, Agent, or Firm* — Cooper & Dunham LLP

(57) ABSTRACT

A cleaning blade includes a supporting member, and a tabular elastic member. One end portion of the elastic member is fixed to the supporting member, and the other end portion is a free end portion whose tip edge is to be contacted with a member to be cleaned while rubbing the surface to remove a residual material therefrom. The tip portion of the free end portion of the elastic member ranging in length from 0 to 500 μm from the tip surface thereof includes at least a cured material of a curable compound and an elastic material of the elastic member. The elastic member satisfies the relationship, $0.05(\%) \leq [(t_M - t_A)/t_A] \times 100 \leq 2\%$, wherein $t_M$ represents the maximum thickness of the tip portion of the elastic member, and $t_A$ represents the average thickness of the rear portion of the free end portion of the elastic member.

14 Claims, 6 Drawing Sheets

(56) References Cited

U.S. PATENT DOCUMENTS

| | | |
|---|---|---|
| 5,147,751 A | 9/1992 | Kojima et al. |
| 5,342,718 A | 8/1994 | Nousho et al. |
| 5,363,182 A * | 11/1994 | Kuribayashi et al. ......... 399/350 |
| 5,438,400 A * | 8/1995 | Kuribayashi et al. ......... 399/350 |
| 5,450,184 A * | 9/1995 | Yanai et al. .................... 399/350 |
| 5,991,573 A | 11/1999 | Nohsho et al. |
| 6,030,733 A | 2/2000 | Kami et al. |
| 6,060,205 A | 5/2000 | Takeichi et al. |
| 6,151,468 A | 11/2000 | Kami et al. |
| 6,160,977 A | 12/2000 | Takeichi et al. |
| 6,363,237 B1 | 3/2002 | Nagame et al. |
| 6,521,386 B1 | 2/2003 | Sakon et al. |
| 6,562,529 B1 | 5/2003 | Kojima et al. |
| 8,712,309 B2 * | 4/2014 | Watanabe et al. ............. 399/350 |
| 2001/0031411 A1 | 10/2001 | Kojima et al. |
| 2002/0051654 A1 | 5/2002 | Niimi et al. |
| 2002/0115005 A1 | 8/2002 | Ikuno et al. |
| 2002/0197549 A1 | 12/2002 | Sakon et al. |
| 2003/0035661 A1 | 2/2003 | Kabata et al. |
| 2003/0049555 A1 | 3/2003 | Sakon et al. |
| 2003/0152854 A1 | 8/2003 | Kojima et al. |
| 2003/0165757 A1 | 9/2003 | Kojima et al. |
| 2003/0219279 A1 | 11/2003 | Nohsho et al. |
| 2004/0048178 A1 | 3/2004 | Ikuno et al. |
| 2004/0058260 A1 | 3/2004 | Katoh et al. |
| 2005/0026058 A1 | 2/2005 | Kami et al. |
| 2005/0031377 A1 | 2/2005 | Kabata et al. |
| 2005/0053853 A1 | 3/2005 | Sugino et al. |
| 2005/0118518 A1 | 6/2005 | Ikegami et al. |
| 2005/0238977 A1 | 10/2005 | Kojima et al. |
| 2006/0062595 A1 | 3/2006 | Nousho et al. |
| 2006/0210908 A1 | 9/2006 | Umemura et al. |
| 2006/0269323 A1 | 11/2006 | Kabata et al. |
| 2007/0287083 A1 | 12/2007 | Gondoh et al. |
| 2008/0063962 A1 | 3/2008 | Toshine et al. |
| 2008/0102391 A1 | 5/2008 | Yanagawa et al. |
| 2008/0112742 A1 | 5/2008 | Nakamori et al. |
| 2008/0113285 A1 | 5/2008 | Nakamori et al. |
| 2008/0219694 A1 | 9/2008 | Nakamori et al. |
| 2008/0227007 A1 | 9/2008 | Tamoto et al. |
| 2009/0035017 A1 | 2/2009 | Tada et al. |
| 2009/0148186 A1 | 6/2009 | Yasuda et al. |
| 2009/0180788 A1 | 7/2009 | Tamoto et al. |
| 2009/0185821 A1 | 7/2009 | Iwamoto et al. |
| 2009/0311017 A1 * | 12/2009 | Ohmori et al. ................. 399/350 |
| 2009/0324281 A1 | 12/2009 | Tada et al. |
| 2010/0010204 A1 | 1/2010 | Ohta et al. |
| 2010/0067953 A1 | 3/2010 | Nohsho et al. |
| 2010/0129112 A1 | 5/2010 | Tada et al. |
| 2010/0232831 A1 | 9/2010 | Fujiwara et al. |
| 2010/0310975 A1 | 12/2010 | Tada et al. |
| 2010/0329741 A1 | 12/2010 | Nohsho et al. |
| 2011/0135361 A1 | 6/2011 | Kabata et al. |
| 2011/0159418 A1 | 6/2011 | Sakaguchi et al. |
| 2011/0159420 A1 | 6/2011 | Sakaguchi et al. |
| 2011/0200926 A1 | 8/2011 | Tanaka et al. |
| 2011/0217102 A1 | 9/2011 | Ohmori et al. |
| 2012/0021346 A1 | 1/2012 | Nagayama et al. |
| 2012/0063816 A1 | 3/2012 | Yamashita et al. |
| 2012/0063826 A1 | 3/2012 | Ohmori et al. |
| 2012/0308257 A1 * | 12/2012 | Arimura et al. ................ 399/101 |
| 2013/0064578 A1 | 3/2013 | Yamashita et al. |
| 2013/0189012 A1 | 7/2013 | Sakon et al. |
| 2013/0243506 A1 | 9/2013 | Ikuno et al. |
| 2013/0243507 A1 | 9/2013 | Sakon et al. |
| 2014/0064810 A1 | 3/2014 | Iwamoto et al. |
| 2014/0178103 A1 | 6/2014 | Gohda et al. |
| 2014/0205338 A1 | 7/2014 | Gondoh et al. |
| 2014/0270876 A1 | 9/2014 | Yamashita et al. |
| 2014/0356042 A1 | 12/2014 | Gondoh et al. |

FOREIGN PATENT DOCUMENTS

| | | |
|---|---|---|
| JP | 2004-233818 | 8/2004 |
| JP | 2009300754 A * | 12/2009 |
| JP | 2010-152295 | 7/2010 |
| WO | WO 2014121692 A1 * | 8/2014 |

* cited by examiner

PROJECTED IMAGE OF PARTICLE
PERIMETER: C1
AREA: S

CIRCLE WITH AREA OF S
PERIMETER: C2
AREA: S

CLEANING BLADE, AND IMAGE FORMING APPARATUS AND PROCESS CARTRIDGE USING THE CLEANING BLADE

CROSS-REFERENCE TO RELATED APPLICATIONS

This patent application is based on and claims priority pursuant to 35 U.S.C. §119 to Japanese Patent Application No. 2014-050409 filed on Mar. 13, 2014 in the Japan Patent Office, the entire disclosure of which is hereby incorporated by reference herein.

BACKGROUND

1. Technical Field

This disclosure relates to a cleaning blade, and to an image forming apparatus and a process cartridge, which use the cleaning blade.

2. Description of the Related Art

In electrophotographic image forming apparatuses, residual toner remaining on the surface of an image bearer such as photoconductors even after a toner image thereon is transferred onto a recording medium or an intermediate transfer medium is removed therefrom using a cleaner.

A cleaning blade is typically used as a cleaning member of such a cleaner because of having advantages such that the cleaner has simple structure and good cleanability. Such a cleaning blade typically includes an elastic member made of a gum elastic such as polyurethane rubbers, and a supporting member to support the elastic member. The cleaning blade typically has a configuration such that one end of the elastic member is supported by the supporting member, and an edge (i.e., tip edge) of the other end (i.e., free end) of the elastic member is contacted with a surface of an image bearer to block and scrape off residual toner on the surface of the image bearer, thereby removing the residual toner from the surface of the image bearer.

In attempting to fulfill a recent need for high quality images, there are image forming apparatuses using toner (hereinafter sometimes referred to as polymerization toner), which is substantially spherical and has a relatively small particle diameter and which is prepared by a method such as polymerization methods. Since polymerization toner has such an advantage as to have a higher transfer efficiency than pulverization toner, which has been conventionally used for image forming apparatuses, the polymerization toner can fulfill the need. However, polymerization toner has such a drawback as not to be easily removed from an image bearer by such a cleaning blade as mentioned above, resulting in occurrence of defective cleaning (hereinafter referred to as a toner passing problem). This is because such polymerization toner has a high circularity and a small particle diameter, and therefore easily passes through a small gap between the tip of a cleaning blade and the surface of an image bearer.

In attempting to prevent occurrence of such a toner passing problem, a technique such that the pressure to a cleaning blade contacted with the surface of an image bearer is increased (i.e., contact pressure of a cleaning blade is increased) is often used to enhance the cleanability of the cleaning blade. However, it is well known that when the contact pressure of such a cleaning blade is increased, the following problem is caused.

Specifically, as illustrated in FIG. 2A, when the contact pressure of a cleaning blade 62 is increased, the friction between the cleaning blade 62 and a member 123 to be cleaned (hereinafter sometimes referred to as an image bearer) is increased, and a tip edge 62c of a tip surface 62a of the cleaning blade 62 is pulled by the moving surface of the image bearer 123 in the moving direction of the image bearer, thereby everting the tip edge portion of the tip surface 62a of the cleaning blade 62. In this regard, since the thus everted tip edge portion of the cleaning blade 62 is returned to the original state due to the restoring force of the cleaning blade. In this case, an abnormal sound is generated. Since the eversion and restoration of the tip edge portion are repeated, the tip edge portion tends to vibrate, resulting in generation of fluttering sounds (i.e., occurrence of a fluttering sound problem).

When the cleaning operation is continued while the tip edge portion of the cleaning blade 62 is everted, the a portion X of the tip surface 62a of the cleaning blade 62, which portion is few micrometers away from the tip edge 62c, is abraded as illustrated in FIG. 2B. When the cleaning blade 62 is further used for the cleaning operation, the tip edge portion of the tip surface 62a of the cleaning blade 62 is further abraded, resulting in lack of the tip edge 62c of the cleaning blade 62 as illustrated in FIG. 2C. The cleaning blade 62 having no tip edge hardly removes residual toner from the surface of the image bearer 123, thereby causing a cleaning problem in that an abnormal image such that background of an image is soiled with residual toner is formed. Therefore, a need exists for a cleaning blade which can maintain good cleanability without being everted even when the contact pressure of the cleaning blade is increased.

FIGS. 2A-2C will be described later in detail.

In addition, in attempting to solve the problem in that the portion (i.e., tip edge portion, hereinafter sometimes referred to as a abutment part) of a cleaning blade contacted with an image bearer is everted, it is attempted to increase the hardness of the abutment part so that the abutment part is hardly deformed.

For example, a cleaning blade made of a polyurethane elastomer is proposed in which the abutment part thereof is coated with a resin having a pencil hardness of from B to 6H to enhance the angular accuracy of the edge while decreasing the friction coefficient of the cleaning blade.

In addition, a cleaning blade is proposed which includes a urethane rubber blade and a silicon-including layer formed on the abutment part of the rubber blade, wherein the surface of the silicon-including layer is cured. It is described therein that a good combination of low frictional property and abrasion resistance can be imparted to the blade.

Further, a cleaning blade is proposed which includes an elastic blade and an outermost layer formed on the tip edge portion of the elastic blade, wherein the tip edge portion has been subjected to a low friction coefficient treatment, and wherein the outermost layer is harder than the elastic blade. It is described therein that the blade can maintain good cleanability with hardly causing the flattering sound problem.

SUMMARY

As an aspect of this disclosure, a cleaning blade is provided which includes a supporting member; and a tabular elastic member. The elastic member includes a first end portion fixed to the supporting member, and a second end portion which is a free end portion not contacted with the supporting member and whose tip edge is to be contacted with a surface of a member to be cleaned while rubbing the surface of the member to be cleaned to remove a residual material from the surface of the member to be cleaned. The tip portion of the second end portion of the elastic member, which is defined as a portion ranging in length in the longitudinal direction of the elastic member from 0 to 500 μm from a tip surface of the second end portion, includes both a cured material of a curable compound and an elastic material of the elastic member. In addition, the elastic member satisfies the following relationship:

$$0.05(\%) \leq [(t_M - t_A)/t_A] \times 100 \leq 2(\%),$$

wherein $t_M$ represents the maximum thickness of the tip portion of the second end portion of the elastic member, and $t_A$ represents the average thickness of a rear portion of the second end portion of the elastic member other than the tip portion.

As another aspect of this disclosure, an image forming apparatus is provided which includes an image bearer; a charger to charge a surface of the image bearer; an irradiator to irradiate the charged surface of the image bearer with light to form an electrostatic latent image on the surface of the image bearer; a developing device to develop the electrostatic latent image with a developer including a toner to form a toner image on the surface of the image bearer; a transferring device to transfer the toner image to a recording medium; a fixing device to fix the toner image to the recording medium; and a cleaner including the above-mentioned cleaning blade to clean the surface of the image bearer with the cleaning blade.

As another aspect of this disclosure, a process cartridge is provided which includes at least an image bearer; and a cleaner including the above-mentioned cleaning blade to clean the surface of the image bearer with the cleaning blade, wherein the process cartridge is detachably attachable to an image forming apparatus as a single unit.

The aforementioned and other aspects, features and advantages will become apparent upon consideration of the following description of the preferred embodiments taken in conjunction with the accompanying drawings.

DETAILED DESCRIPTION

Figure 1:
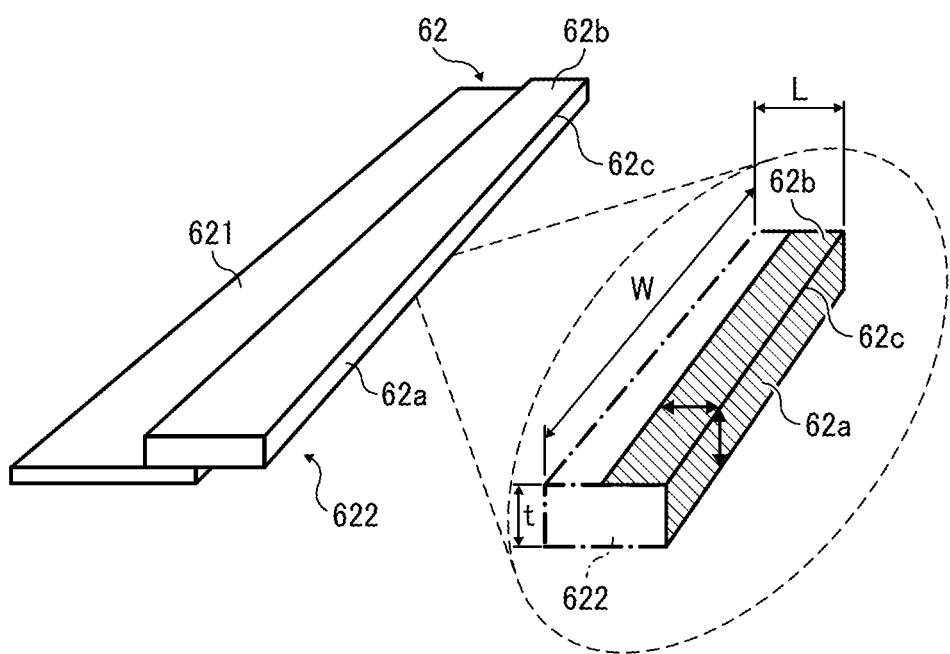
FIG. 1 is a perspective view illustrating a cleaning blade according to an embodiment.

The resins (ultraviolet cured resins) used for the proposed cleaning blades mentioned above have high crosslinkage density, and therefore the outermost layer formed on the abutment part of the blades using the resins is shrunk when the outermost layer (ultraviolet curable resin) is cured, thereby causing a problem in that the layer is cracked or peeled from the blades.

In addition, if the contact pressure of a cleaning blade contacted with an image bearer is increased to prevent toner particles from passing through the nip between the cleaning blade and the surface of the image bearer, the above-mentioned cleaning problem in that the tip edge portion of the blade is everted, followed by local abrasion and lack of the tip edge portion, thereby forming abnormal images is easily caused.

The object of this disclosure is to provide a cleaning blade, which can maintain good cleanability over a long period of time without causing the cleaning problem in that the tip edge portion of the blade contacted with a surface of a member to be cleaned is everted.

As a result of the present inventors' diligent investigation, it is found that the above-mentioned problem to be solved can be solved by a cleaning blade in which a prescribed portion of the abutment part (i.e., tip edge portion) of an elastic member of the cleaning blade is subjected to a curing treatment using a curable compound so that the portion includes both the elastic material of the elastic member and a cured material of the curable compound while controlling the below-mentioned increasing rate (IR) so as to fall in a proper range:

$$IR(\%) = [(t_M - t_A)/t_A] \times 100,$$

wherein $t_M$ represents the maximum thickness of a tip portion of the elastic member ranging in length in the longitudinal direction of the elastic member from 0 to 500 μm from a tip surface thereof, and $t_A$ represents the average thickness of a rear portion of the free end of the elastic member other than the tip portion.

The cleaning blade of this disclosure includes a supporting member; and a tabular elastic member, wherein one end of the elastic member is fixed to the supporting member, and the other end thereof is a free end whose tip edge is to be contacted with a surface of a member to be cleaned while rubbing the surface of the member to be cleaned to remove a residual material from the surface of the member to be cleaned. The tip portion of the elastic member, which is defined as a portion ranging in length in the longitudinal direction of the elastic member from 0 to 500 μm from a tip surface thereof, includes at least a cured material of a curable compound and an elastic material of the elastic member. In addition, the elastic member satisfies the following relationship:

$$0.05(\%) \leq [(t_M - t_A)/t_A] \times 100 \leq 2(\%),$$

wherein $t_M$ represents the maximum thickness of the tip portion of the free end of the elastic member, and $t_A$ represents the average thickness of a rear portion of the free end of the elastic member other than the tip portion.

In the cleaning blade of this disclosure, since the tip portion of the elastic member of the cleaning blade, which is defined as a portion ranging in length in the longitudinal direction of the elastic member from 0 to 500 μm from a tip surface thereof, includes at least a cured material of a curable compound and an elastic material of the elastic member, and the increasing rate (IR) of the maximum thickness of the tip portion of the cleaning blade, which is defined as $[(t_M - t_A)/t_A] \times 100$, is controlled so as to fall in the range of from 0.05% to 2%, the cleaning blade can maintain a proper hardness and a proper impact resilience coefficient without causing the cracking problem in that the outermost layer is cracked. In addition, since the tip portion of the cleaning blade in the vicinity of the tip edge thereof has a relatively great maximum thickness, the tip portion hardly deforms, and therefore the cleaning blade can maintain good cleanability without causing the tip eversion problem in that the tip edge is everted when the contact pressure of the cleaning blade with the material to be cleaned is increased.

The cleaning blade of this disclosure includes a strip-shaped elastic member, and is set in such a manner that one end of the elastic member is fixed to a supporting member, and the other end, which is a free end, is contacted with a surface of a member to be cleaned while rubbing the surface of the member to be cleaned. The cleaning blade has a function to remove a residual material from the surface of the member to be cleaned.

(Member to be Cleaned)

The member to be cleaned is not particularly limited, and the cleaning blade of this disclosure can be used for various members. For example, when the cleaning blade is used for an image forming apparatus, the cleaning blade can be used for image bearers such as photoconductors and intermediate transfer media.

The constituent, shape, structure and size of the member to be cleaned are not particularly limited. For example, with respect to shape, the member to be cleaned can have any shape such as drum-shape, belt-shape, plate-shape and sheet-shape. The size of the member to be cleaned is not particularly limited, but is preferably an ordinary size. The constituent of the member to be cleaned is not particularly limited, and materials such as metals, plastics and ceramics can be used.

(Residual Material)

The residual material to be removed by the cleaning blade of this disclosure from a surface of the member to be cleaned is not particularly limited. Specific examples thereof include toner, lubricants, particulate inorganic materials, particulate organic materials, dust, and combinations of these materials.

Next, an example of the cleaning blade of this disclosure, which is used for a cleaner of an image forming apparatus, will be described.

(Cleaning Blade)

The cleaning blade of this disclosure includes a supporting member, and a tabular elastic member, wherein one end of the elastic member is fixed to the supporting member, and the other end thereof is a free end. The cleaning blade can further includes another member if necessary. The cleaning blade preferably has a configuration such that one end thereof is connected with the supporting member, and the portion (i.e., free end portion) of the cleaning blade extending from the supporting member without being contacted with the supporting member, has a predetermined length L (illustrated in FIG. 1) in the longitudinal direction thereof. The cleaning blade is set in such a manner that the tip edge (abutment part) of the free end portion is contacted with a surface of the member to be cleaned. In this regard, the laterally extending tip edge 62c having a width W (illustrated in FIG. 1) is contacted with the member to be cleaned.

FIG. 1 is a schematic perspective view illustrating basic configuration of an example of the cleaning blade of this disclosure.

Referring to FIG. 1, a cleaning blade 62 includes a tabular (i.e., strip-shaped) supporting member 621, which is made of a rigid material such as metals and hard plastics, and a tabular (i.e., strip-shaped) elastic member 622. One end of the elastic member 622 is fixed to one end of the supporting member 621, for example, by an adhesive, and the other end of the supporting member 621 is supported (cantilevered) by a case of the cleaner (e.g., a cleaner 6 illustrated in FIG. 5). Therefore, the other end of the elastic member 622 is a free end. The cleaning blade 62 is set in such a manner that the tip edge (abutment part) 62c is contacted with a surface of a member to be cleaned while rubbing the surface of the member to be cleaned.

The free end portion of the elastic member 622 has a predetermined length, and one tip edge 62c of the tip portion of the free end portion of the elastic member 622 is to be contacted with a surface of a member to be cleaned (such as image bearer) in such a manner that the tip edge 62c extends in the width direction of the image bearer.

In FIG. 1, numerals 62a and 62b respectively denote the tip surface of the elastic member 622, and the back surface of the elastic member, which is not contacted with the supporting member 621. In addition, characters t, L and W respectively denote the thickness of the elastic member 622, the length of the free end portion of the elastic member in the longitudinal direction, and the width of the elastic member in the lateral direction (i.e., the length of the tip edge 62c).

When a conventional cleaning blade is contacted with a surface of an image bearer at a high contact pressure to prevent residual toner from passing through the nip between the cleaning blade and the surface of the image bearer, the problem in that the tip edge of the cleaning blade is everted, followed by local abrasion and lack of the tip portion of the cleaning blade, thereby forming abnormal images is easily caused as mentioned above by reference to FIGS. 2A-2C.

Figure 2A:
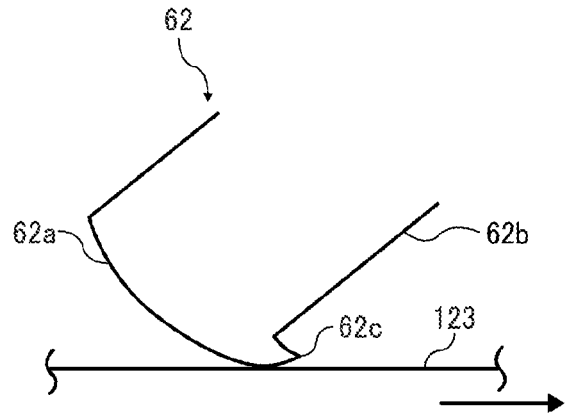
FIG. 2A is a schematic view illustrating a conventional cleaning blade whose tip edge (abutment part) is everted.
Figure 2B:
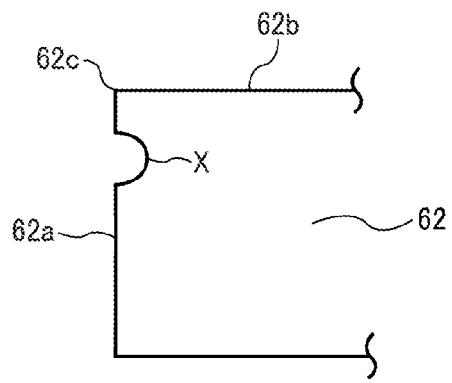
FIG. 2B is a schematic view illustrating the conventional cleaning blade whose tip portion is locally abraded.
Figure 2C:
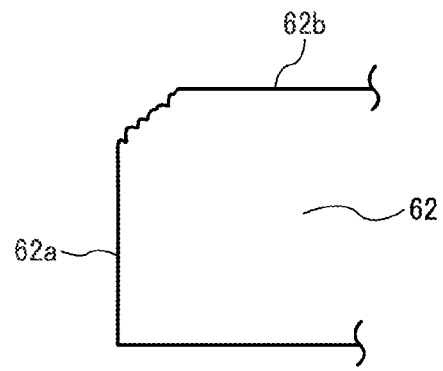
FIG. 2C is a schematic view illustrating the conventional cleaning blade whose tip edge is worn out.

Specifically, FIG. 2A illustrates a conventional cleaning blade whose tip edge is everted; FIG. 2B illustrates the conventional cleaning blade whose tip portion is locally abraded; and FIG. 2C illustrates the conventional cleaning blade whose tip edge is worn out. In FIGS. 2A-2C, numeral 62 denotes a cleaning blade, numeral 62a denotes a tip surface of the cleaning blade, numeral 62b denotes a back surface of the cleaning blade, numeral 62c denotes a tip edge (abutment part) of the cleaning blade, and numeral 123 denotes a member to be cleaned (such as image bearers).

Referring back to FIG. 1, the cleaning blade 62 has a configuration such that one end of the tabular elastic member 622 is connected with the supporting member 621, and the portion (free end portion) of the cleaning blade extending from the supporting member without being contacted with the supporting member, has a predetermined length in the longitudinal direction of the elastic member 622. The cleaning blade is set in such a manner that the tip edge (abutment part) 62c of the free end portion, which extends laterally and has a width W, is contacted with a surface of the member to be cleaned.

In order that the elastic member 622 can be satisfactorily contacted with the surface of a member (such as image bearer) to be cleaned (i.e., the elastic member has good image bearer following capacity) even when the member to be cleaned is eccentric or the surface thereof is waved, the elastic member 622 is preferably made of a material having a high impact resilience coefficient such as polyurethane rubbers.

As mentioned above, conventional cleaning blades having a configuration such that an outermost layer is formed on an elastic member easily cause the cracking problem in that the outermost layer is cracked or the peeling problem in that the outermost layer is peeled from the elastic member, and cause the tip eversion problem in that the tip edge is everted, resulting in abrasion or lack of the tip portion of the cleaning blade when the contact pressure of the cleaning blade contacted with the member to be cleaned is increased to prevent the toner passing problem.

In contrast, in the cleaning blade of this disclosure, the tip portion of the elastic member, which is defined as a portion ranging in length in the longitudinal direction of the elastic member from 0 to 500 μm from the tip surface thereof, includes both a cured material of a curable compound, and an elastic material of the elastic member. In addition, the increasing rate (IR) of the maximum thickness of the tip portion of the elastic member, which is defined as $\{[(t_M-t_A)/t_A]\times100\}$, is controlled so as to fall in a range of from 0.05% to 2%. Namely, the elastic member satisfies the following relationship:

$$0.05(\%)\leq[(t_M-t_A)/t_A]\times100\leq2(\%),$$

wherein $t_M$ represents the maximum thickness of the tip portion of the free end portion of the elastic member, and $t_A$ represents the average thickness of a rear portion of the free end portion of the elastic member other than the tip portion.

The method for preparing the tip portion including both a cured material of a curable compound, and an elastic material is not particularly limited, and for example, a method in which an elastic member is dipped into a liquid including a curable monomer or oligomer so that the elastic member is impregnated with the monomer or oligomer, followed by curing the monomer or oligomer can be used.

When the increasing rate (IR) of maximum thickness of the tip portion is less than 0.05%, the tip eversion problem tends to be caused. In contrast, when the increasing rate (IR) is greater than 2%, not only the tip edge 62c but also the back surface 62b tend to be contacted with the member to be cleaned, resulting in deterioration of the cleanability of the cleaning blade.

The maximum thickness of the tip portion of the elastic member, which is defined as a portion ranging in length in the longitudinal direction of the elastic member from 0 to 500 μm from the tip surface thereof, and the average thickness of the rear portion of the elastic member other than the tip portion will be described by reference to FIG. 3.

Figure 3:
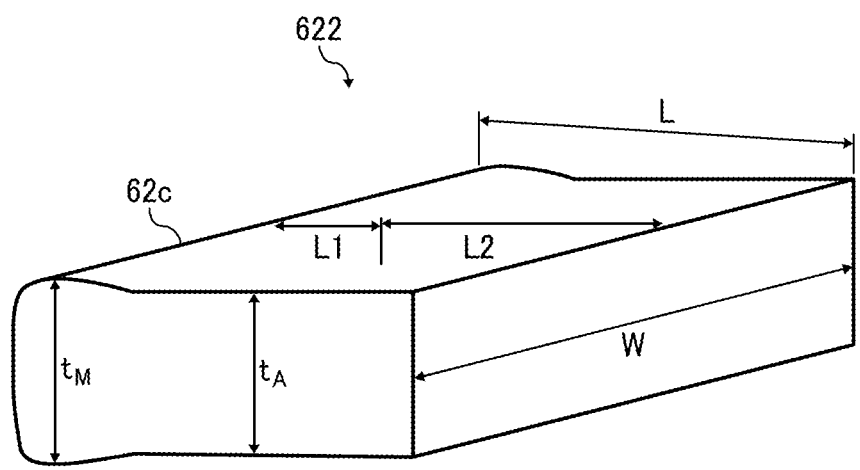
FIG. 3 is a schematic view illustrating the free end of the elastic member of the cleaning blade illustrated in FIG. 1.

FIG. 3 illustrates the elastic member having a tip portion whose maximum thickness increasing rate (IR) is controlled so as to fall in the above-mentioned range.

In FIG. 3, character $t_M$ denotes the maximum thickness of the tip portion of the elastic member, character $t_A$ denotes the average thickness of the rear portion of the elastic member other than the tip portion, character L denotes the longitudinal direction of the free end portion of the elastic member, and character W denotes the width of the elastic member in the lateral direction.

The thickness (average thickness $t_A$, and maximum thickness $t_M$) of the cleaning blade (elastic member) can be measured by cutting the cleaning blade with a razor in the thickness direction, and measuring the thickness with a digital microscope or the like. Specific examples of the digital microscope include VHX Series from Keyence Corporation.

(Supporting Member)

The shape, size and constituent of the supporting member 621 are not particularly limited, and are properly determined depending on the purpose of the supporting member. Specific examples of the shape include plate-shape, strip-shape, sheet-shape, etc. The size is preferably determined depending on the size of the member to be cleaned. Specific examples of the constituent include metals, plastics, ceramics, etc. Among these materials, metal plates are preferable, and steel plates (e.g., stainless steel plates), aluminum plates, and phosphor bronze plates are more preferable.

(Elastic Member)

The shape, size and constituent of the elastic member 622 are not particularly limited, and are properly determined so that the resultant cleaning blade can fulfill the needs. With respect to the shape, plate-shape (strip-shape) is preferable. The size is preferably determined depending on the size of the member to be cleaned. The constituent of the elastic member is not particularly limited as long as the member is elastic. Among various elastic materials, polyurethane rubbers, polyurethane elastomers, etc. are preferable because of having a high elasticity.

The method for preparing the elastic member is not particularly limited. For example, the following method can be used. Specifically, a polyurethane prepolymer is prepared using a polyol compound and a polyisocyanate compound. Next, the polyurethane prepolymer is mixed with a hardener and an optional curing catalyst, and the mixture is subjected to a crosslinking treatment using a predetermined die, followed by an after-crosslinkage treatment in an oven and centrifugal molding, to prepare a sheet-shaped member. After the sheet-shaped member is allowed to settle at room temperature to be aged, the sheet-shaped member is cut so as to have a proper size, resulting in preparation of an elastic member for use in the cleaning blade.

High molecular weight polyols and low molecular weight polyols can be used as the polyol for use in preparing the polyurethane prepolymer.

Specific examples of such high molecular weight polyols include polyester polyols, which are condensation products of an alkylene glycol and an aliphatic dibasic acid (such as polyester polyols of an alkylene glycol and adipic acid (e.g., ethylene adipate ester polyol, butylene adipate ester polyol, hexylene adipate ester polyol, ethylene propylene adipate ester polyol, ethylene butylene adipate ester polyol, and ethylene neopentylene adipate ester polyol)); polycaprolactone-based polyols (such as polycaprolactone ester polyols, which are prepared by subjecting caprolactone to ring-opening polymerization); polyether polyols (such as poly(oxytetramethylene) glycol, and poly(oxypropylene) glycol); etc. These can be used alone or in combination.

Specific examples of the low molecular weight polyols include dihydric alcohols such as 1,4-butanediol, ethylene glycol, neopentyl glycol, hydroquinone-bis(2-hydroxyethyl) ether, 3,3'-dichloro-4,4'-diaminodiphenylmethane, and 4,4'-diaminodiphenylmethane; tri- or more-hydric alcohols such as 1,1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol. These can be used alone or in combination.

Specific examples of the polyisocyanate compounds include, but are not limited thereto, methylenediphenyl diisocyante (MDI), tolylene diisocyanate (TDI), xylylene diisocyanate (XDI), naphthylene 1,5-diisocyanate (NDI), tetramethylxylylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), trimethylhexamethylene diisocyanate (TMDI), etc. These can be used alone or in combination.

The curing catalyst is not particularly limited, and specific examples thereof include 2-methylimidazole, 1,2-dimethylimidazole, etc.

The added amount of such a curing catalyst is not particularly limited, but is preferably from 0.01% to 0.5% by weight, and more preferably from 0.05% to 0.3% by weight, based on the weight of the polyurethane prepolymer.

The hardness (JIS-A hardness) of the elastic member is not particularly limited, but is preferably not less than 60°, and more preferably from 65° to 90°. When the hardness of the elastic member is less than 60°, a proper pressure is hardly applied to a member to be cleaned by the cleaning blade, and the area of the abutment part of the cleaning blade contacted with the member to be cleaned increases, thereby causing defective cleaning.

The structure of the elastic member 622 is not particularly limited, and may be a single-layer structure or a multi-layer structure. For example, an elastic member having a two or more-layer structure such that materials having different JIS-A hardness are laminated can be preferably used because the elastic member has a good combination of abrasion resistance and image bearer following capacity. In this regard, the JIS-A hardness is measured by the method described in JIS K6253 while using a micro rubber hardness tester MD-1, which is manufactured by KOBUNSHI KEIKI CO., LTD. and which uses a pressing plate and a pressing needle and determines hardness of a sample based on the travel distance of the pressing needle.

The impact resilience coefficient of the elastic member 622, which is measured by the method described in JIS K6255, is not particularly limited, and is properly determined so that the resultant cleaning blade can fulfill the needs. The impact resilience coefficient can be measured by using a resilience tester No. 221 manufactured by Toyo Seiki Seisakusho, Ltd., and a method described in JIS K6255.

The average thickness of the elastic member 622 is not particularly limited, but is preferably from 1.0 mm to 3.0 mm.

At least the tip portion of the elastic member 622, which is defined as a portion ranging in length in the longitudinal direction of the elastic member from 0 to 500 μm from a tip surface 62a thereof, is subjected to a curing treatment so that the tip portion includes both a cured material of a curable compound and an elastic material of the elastic member.

Specifically, the tip portion (i.e., a thicker portion L1 illustrated in FIG. 3) of the elastic member is impregnated with a liquid including a curable compound, followed by curing the curable compound (i.e., the tip portion is subjected to an impregnation/curing treatment). Thus, the elastic member 622 is prepared.

In this regard, (meth)acrylate compounds are preferably used as the curable compound (hereinafter sometimes referred to as a curable monomer) in the impregnation/curing treatment. In addition, the liquid including the curable monomer is preferably an ultraviolet curable composition. Specifically, the cured material in the tip portion of the elastic member is preferably prepared by curing the ultraviolet curable composition.

For example, the tip portion L1 of an elastic member is impregnated with an ultraviolet curable composition including a (meth)acrylate compound (an acrylate and/or a methacrylate) having an alicyclic structure with 6 or more carbon atoms, followed by curing the composition. Thus, the elastic member 622 can be prepared.

(Liquid Including Curable Monomer)

The liquid (treatment liquid) including a curable monomer preferably includes a (meth)acrylate compound as the curable monomer, and more preferably a (meth)acrylate compound having an alicyclic structure with 6 or more carbon atoms. The treatment liquid can optionally include other components. The treatment liquid including a curable monomer is preferably an ultraviolet curable composition.

((Meth)Acrylate Compound Having Alicyclic Structure with 6 or More Carbon Atoms)

(Meth)acrylate compounds having an alicyclic structure include a bulky alicyclic structure in the molecule thereof. Therefore, a (meth)acrylate compound having a small number of functional groups while having a low molecular weight can be used for the liquid used for the impregnation treatment. In this case, the tip portion (including the abutment part) of the elastic member can be easily impregnated with the treatment liquid including such a (meth)acrylate compound. Therefore, the hardness of the abutment part can be efficiently enhanced while the impact resilience coefficient of the abutment part is maintained. In addition, when an outermost layer is formed on the abutment part of the elastic member, occurrence of cracking and peeling of the outermost layer can be prevented.

The carbon number of the alicyclic structure of the (meth)acrylate compound is preferably 6 to 12, and more preferably from 8 to 10. When the carbon number is less than 6, the hardness of the abutment part tends to decrease. In contrast, when the carbon number is greater than 12, steric hindrance tends to occur.

The number of functional groups included in the (meth)acrylate compound having an alicyclic structure with 6 or more carbon atoms is preferably from 2 to 6, and more preferably from 2 to 4. When the number of functional groups is less than 2, the hardness of the abutment part tends to decrease (i.e., the abutment part weakens). In contrast, when the number of functional groups is greater than 6, steric hindrance tends to occur.

The molecular weight of the (meth)acrylate compound having an alicyclic structure with 6 or more carbon atoms is preferably not greater than 500. When the molecular weight is greater than 500, it becomes hard for the compound to penetrate into the elastic member because the compound has a large molecular size, thereby often making it impossible to impart high hardness to the elastic member.

Among various (meth)acrylate compounds having an alicyclic structure with 6 or more carbon atoms, at least one compound selected from (meth)acrylate compounds having a tricyclodecane structure, and (meth)acrylate compounds having an adamantane structure is preferably used. This is because the compound can compensate for the lack of crosslinkage points due to the special structure of the tricyclodecane or adamantane skeleton even when the number of functional groups is relatively small.

The (meth)acrylate compound having a tricyclodecane structure is not particularly limited, and for example, tricyclodecane dimethanol diacrylate, and tricyclodecane dimethanol dimethacrylate can be preferably used.

Synthesized compounds and marketed products can be used for the (meth)acrylate compound having a tricyclodecane structure. Specific examples of the marketed products include A-DCP from Shin-Nakamura Chemical Co., Ltd., which has a molecular weight of 304.

The (meth)acrylate compound having an adamantane structure is not particularly limited, and for example, 1,3-adamantane dimethanol diacrylate, 1,3-adamantane dimethanol dimethacrylate, 1,3,5-adamantane trimethanol triacrylate, and 1,3,5-adamantane trimethanol trimethacrylate can be preferably used.

Synthesized compounds and marketed products can be used for the (meth)acrylate compound having an adamantane structure. Specific examples of the marketed products include X-DA and X-A-201 from Idemitsu Kosan Co., Ltd., and ADTM from Mitsubishi Gas Chemical Co., Inc.

The content of such a (meth)acrylate compound having an alicyclic structure with 6 or more carbon atoms in the treatment liquid (such as ultraviolet curable composition) is not particularly limited, but is preferably from 20% to 100% by weight, and more preferably from 50% to 100% by weight, based on the weight of the curable monomer included in the treatment liquid. When the content is less than 20% by weight, it becomes hard for the compound to impart a high hardness to the elastic member using the special ring structure thereof.

Whether or not such a (meth)acrylate compound having an alicyclic structure with 6 or more carbon atoms is included in the abutment part (tip edge portion) of the elastic member can be determined by an analysis such as infrared microscopy and liquid chromatography.

As mentioned above, (meth)acrylate compounds having a tricyclodecane structure, and (meth)acrylate compounds having an adamantane structure are preferably used as the (meth) acrylate compound having an alicyclic structure with 6 or more carbon atoms.

The treatment liquid (such as ultraviolet curable composition) can include a (meth)acrylate compound having a molecular weight of from 100 to 500 as well as the above-mentioned (meth)acrylate compound having an alicyclic structure with 6 or more carbon atoms.

Specific examples of the (meth)acrylate compound having a molecular weight of from 100 to 500 include dipentaerythritol hexa(meth)acrylate, pentaerythritol tetra(meth)acrylate, pentaerythritol tri(meth)acrylate, pentaerythritolethoxy tetra (meth)acrylate, trimethylolpropane tri(meth)acryalte, trimethylolpropaneethoxy tri(meth)acrylate, 1,6-hexanediol di(meth)acrylate, ethoxylated bisphenol A di(meth)acrylate, propoxylated/ethoxylated bisphenol A di(meth)acrylate, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,11-undecanediol di(meth)acrylate, 1,18-octadecanediol di(meth)acrylate, glycerin propoxy tri(meth)acrylate, dipropylene glycol di(meth)acrylate, tripropylene glycol di(meth)acrylate, polyoxyethylene(PO)-modified neopentyl glycol di(meth)acrylate, polyethylene glycol (600) di(meth)acrylate, polyethylene glycol (400) di(meth)acrylate, polyethylene glycol (200) di(meth)acrylate, neopentyl glycol-hydroxypivalic acid ester di(meth)acrylate, octyl/decy (meth)acrylate, isobonyl(meth)acrylate, ethoxylated phenyl (meth)acrylate, 9,9-bis[4-(2-acryloyloxyethoxyl)phenyl] fluorenone, etc. These can be used alone or in combination.

Among these compounds, compounds having a pentaerythritol structure with 3 to 6 functional groups are preferable. Specific examples thereof include pentaerythritol triacrylate, dipentaerythritol hexaacrylate, etc.

(Other Components Optionally Included in the Liquid Used for Impregnation Treatment)

The treatment liquid used for impregnation treatment can include other components such as photopolymerization initiators, polymerization inhibitors, and diluents.

(Photopolymerization Initiators)

Any photopolymerization initiators can be used as long as the initiators can initiate polymerization by generating active species such as radicals and cations using light energy. Namely, photo-radical-polymerization initiators, photo-cation-polymerization initiators, etc. can be used. Among these initiators, photo-radical-polymerization initiators are preferable.

Suitable materials for use as the photo-radical-polymerization initiators include aromatic ketone compounds, acylphosphine oxide compounds, aromatic onium salt compounds, organic peroxides, thio compounds (e.g., thioxanthone compounds and compounds having a thiophenyl group), hexaarylbiimidazole compounds, ketoneoxime ester compounds, borate compounds, azinium compounds, metallocene compounds, activated ester compounds, compounds having a carbon-halogen bond, alkylamine compounds, etc.

Specific examples of the photo-radical-polymerization initiators include, but are not limited thereto, acetophenone, benzylketal, 1-hydroxycyclohexyl phenyl ketone, 2,2'-dimethoxy-2-phenylacetophenone, xanthone, fluorenone, benzaldehyde, fluorene, anthraquinone, triphenylamine, cabazole, 3-methylacetophenone, 4-chlorobenzophenone, 4,4'-dimethoxybenzophenone, 4,4'-diaminobenzophenone, Michler ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholinopropane-1-one, bis(2,4,6-trimethylbenzoyl)-phenylphophine oxide, 2,4,6-trimethylbenzoyldiphenylphosphine oxide, 2,4-diethylthioxanthone, bis(2,6-dimethoxybenzoyl)-2,4,4-trimethylpentylphosphine oxide, etc. These can be used alone or in combination.

Marketed products of the photo-radical-polymerization initiators can be used. Specific examples thereof include IRGACUREs 651, 184, 2959, 127, 907, 369, 379, 819, 784, OXE01, OXE02 and 754, and DAROCURs 1173 and TPO, which are from Ciba Specialty Chemicals (Ciba Japan K.K.); SPEEDCURE TPO from Lambson Ltd.; KAYACURE DETX-S from Nippon Kayaku Co., Ltd.; LUCIRIN TPO, LR8893 and LR8970, which are from BASF Ltd.; UVECRYL P36 from UCB; etc. These can be used alone or in combination.

The added amount of such a photopolymerization initiator is not particularly limited, but is preferably from 1% to 20% by weight based on the weight of the ultraviolet curable composition.

(Polymerization Inhibitor)

Specific examples of such a polymerization inhibitor include, but are not limited thereto, phenol compounds such as p-methoxyphenol, cresol, t-butylcatechol, di-t-butylparacresol, hydroquinone monomethyl ether, α-naphthol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol); quinone compounds such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-dibutylhydroquinone, mono-t-butylhydroquinone, monomethylhydroquinone, and 2,5-di-t-amylhydroquinone; amine compounds such as phenyl-β-naphthylamine, p-benzylaminophenol, di-β-naphthylparaphenylenediamine, dibenzylhydroxylamine, phenylhydroxylamine, and diethylhydroxylamine; nitro compounds such as dinitrobenzene, trinitrotoluene, and picric acid; oxime compounds such as quinone dioxime, and cyclohexanone oxime; sulfur-containing compounds such as phenothiazine; etc. These can be used alone or in combination.

(Diluent)

Specific examples of the diluent include hydrocarbon solvents such as toluene and xylene; ester solvents such as ethyl acetate, n-butyl acetate, methyl cellosolve acetate, and propylene glycol monomethyl ether acetate; ketone solvents such as methyl ethyl ketone, methyl isobutyl ketone, diisobutyl ketone, cyclohexanone, cyclopentanone and acetone; ether solvents such as ethylene glycol monomethyl ether, ethylene glycol monoethyl ether, propylene glycol monomethyl ether, and tetrahydrofuran; alcohol solvents such as ethanol, propanol, 1-butanol, isopropyl alcohol, and isobutyl alcohol; etc. These can be used alone or in combination.

The tip portion L1 of the elastic member 622, which is defined as a portion ranging in length in the longitudinal direction of the elastic member from 0 to 500 μm from the tip surface 62a thereof, is subjected to a curing treatment using a treatment liquid including a curable monomer so that the tip portion includes both a cured material of the curable monomer and an elastic material of the elastic member.

The method for impregnating the tip portion (abutment part) with the treatment liquid including a curable monomer is not particularly limited, and a proper method is used so that the resultant cleaning blade fulfills the needs. The elastic member impregnated with the curable monomer is subjected to a curing treatment using a proper device such as UV irradiators and heaters.

Examples of the method for impregnating/curing the tip portion (abutment part) with a treatment liquid including an ultraviolet curable monomer (such as (meth)acrylate compounds having an alicyclic structure with 6 or more carbon atoms) are the following.

(1) The tip portion (abutment part) of an elastic member is impregnated with a treatment liquid including a curable monomer (e.g., ultraviolet curable composition) by a coating method such as brush coating and dip coating, followed by curing the curable monomer by heating the curable monomer and/or irradiating the curable monomer with ultraviolet rays;

(2) The tip portion (abutment part) of an elastic member is impregnated with a treatment liquid including a curable monomer (e.g., ultraviolet curable composition) by a coating method such as brush coating and dip coating, and then an outermost layer coating liquid including an ultraviolet curable composition is applied on the abutment part by spray coating, followed by curing the curable monomer and the ultraviolet curable composition by heating the curable monomer and the ultraviolet curable composition and/or irradiating the curable monomer and the ultraviolet curable composition with ultraviolet rays to form a cured outermost layer on the abutment part which includes the cured material of the curable monomer; and (3) The tip portion (abutment part) of an elastic member is impregnated with a treatment liquid including a curable monomer (e.g., ultraviolet curable composition) by a coating method such as brush coating and dip coating, followed by curing the curable monomer by heating the curable monomer and/or irradiating the curable monomer with ultraviolet rays, and then an outermost layer coating liquid including an ultraviolet curable composition is applied on the abutment part by spray coating, followed by curing the ultraviolet curable composition by heating the ultraviolet curable composition and/or irradiating the ultraviolet curable composition with ultraviolet rays to form a cured outermost layer on the abutment part which includes the cured material of the curable monomer.

Among these methods, the method (1) is preferable.

The ultraviolet irradiating conditions are not particularly limited, and the irradiating is performed under proper conditions so that the resultant cleaning blade can fulfill the needs. However, the integral quantity of ultraviolet rays is preferably from 500 to 5,000 mJ/cm$^2$.

By impregnating the abutment part of an elastic member with a treatment liquid (ultraviolet curable composition) including a (meth)acrylate compound, which has an alicyclic structure with 6 or more carbon atoms (preferably tricyclodecane structure or adamantane structure) and which serves as a curable monomer, followed by curing the curable monomer so that the abutment part includes a cured material of the curable monomer, the abutment part can be hardened, and thereby occurrence of the problems in that the abutment part is everted or deformed can be prevented. In addition, even when the cleaning blade is used over a long period of time and thereby the abutment part is abraded (the inner portion of the elastic member is revealed), occurrence of the problems in that the abutment part is everted or deformed can be prevented because the inner portion of the abutment part includes the cured material due to the impregnation treatment.

(Use Conditions of Cleaning Blade)

The pressure at which the cleaning blade of this disclosure is contacted with a surface of a member to be cleaned (e.g., image bearers) is preferably from 10N/m to 100 N/m. When the pressure is less than 10 N/m, a cleaning problem in that residual toner passes through the nip between the tip of the cleaning blade and the surface of the image bearer tends to be caused. In contrast, when the pressure is greater than 100 N/m, the tip eversion problem in that the abutment part is everted tends to be caused. The pressure is more preferably from 10 N/m to 50 N/m.

The pressure can be measured, for example, with an instrument including a small-size compression-type load cell from Kyowa Electronic Instruments Co., Ltd.

The angle between the tangent line at a point of the image bearer, at which the cleaning blade is contacted with the image bearer, and the back surface 62b of the cleaning blade 62 is not particularly limited, but is preferably from 65° to 85°.

When the angle is less than 65°, the tip eversion problem tends to be caused. In contrast, when the angle is greater than 85°, defective cleaning tends to be caused.

Hereinafter, the image forming apparatus of this disclosure, which uses the cleaning blade of this disclosure, will be described.

The image forming apparatus of this disclosure includes an image bearer; a charger to charge a surface of the image bearer; an irradiator to irradiate the charged surface of the image bearer with light to form an electrostatic latent image on the surface of the image bearer; a developing device to develop the electrostatic latent image with a developer including a toner to form a toner image on the surface of the image bearer; a transferring device to transfer the toner image to a recording medium; a fixing device to fix the toner image to the recording medium; and a cleaner to clean the surface of the image bearer, wherein the image forming apparatus is characterized in that the cleaner includes the above-mentioned cleaning blade.

(Image Forming Apparatus)

The image forming apparatus of this disclosure includes an image bearer; a charger to charge a surface of the image bearer; an irradiator to irradiate the charged surface of the image bearer with light to form an electrostatic latent image on the surface of the image bearer; a developing device to develop the electrostatic latent image with a developer including a toner to form a toner image on the surface of the image bearer; a transferring device to transfer the toner image to a recording medium; a fixing device to fix the toner image to the recording medium; and a cleaner to clean the surface of the image bearer with the above-mentioned cleaning blade.

An example of the image forming apparatus of this disclosure will be described by reference to drawings.

Figure 4:
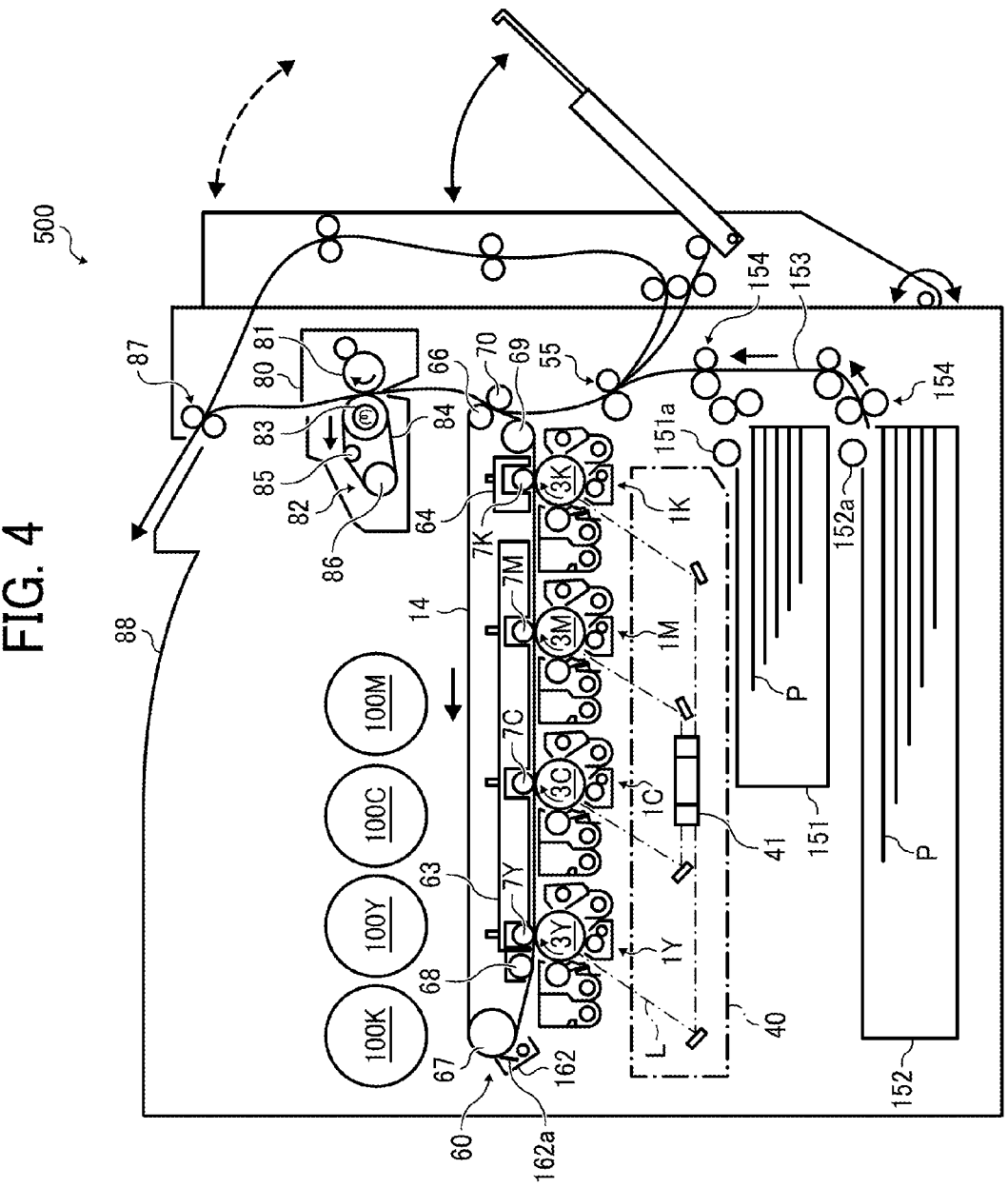
FIG. 4 is a schematic view illustrating an image forming apparatus according to an embodiment.

FIG. 4 is a schematic view illustrating an example of the image forming apparatus of this disclosure.

Referring to FIG. 4, an image forming apparatus 500 includes four image forming units 1Y, 1C, 1M and 1K, which form yellow (Y), cyan (C), magenta (M) and black (K) images using Y, C, M and K toners, respectively. The image forming units 1Y, 1C, 1M and 1K have the same structure except that the color of the toner used is different.

The image forming apparatus 500 further includes a transfer unit 60, which includes an intermediate transfer belt 14 serving as an intermediate transfer medium and which is located above the four image forming units 1. As mentioned later in detail, Y, C, M and K toner images formed on respective photoconductors 3Y, 3C, 3M and 3K serving as image bearers are transferred onto the surface of the intermediate transfer belt 14 so as to be overlaid, resulting in formation of a combined color toner image on the intermediate transfer belt 14.

In addition, an optical writing unit 40 (i.e., irradiator) serving as a latent image forming device is located below the four image forming units 1. The optical writing unit 40 emits light beams L (such as laser beams) based on Y, C, M and K image information to irradiate the photoconductors 3Y, 3C, 3M and 3K with the laser beams L, thereby forming electrostatic latent images, which respectively correspond to the Y, C, M and K images to be formed, on the corresponding photoconductors. The optical writing unit 40 includes a polygon mirror 41, which is rotated by a motor and which reflects the light beams L emitted by a light source of the optical writing unit while deflecting the laser beams to irradiate the photoconductors 3Y, 3C, 3M and 3K with the laser beams L via optical lenses and mirrors. The optical writing unit 40 is not limited thereto, and an optical writing unit using a LED array can also be used therefor.

Below the optical writing unit 40, a first sheet feeding cassette 151, and a second sheet feeding cassette 152 are arranged in such a manner that the first sheet feeding cassette is located above the second sheet feeding cassette. Each of the sheet feeding cassettes 151 and 152 contains a bundle of sheets of a recording medium P. Uppermost sheets of the recording sheet P in the first and second sheet feeding cassettes 151 and 152 are contacted with a first sheet feeding roller 151a and a second sheet feeding roller 152a, respectively. When the first sheet feeding roller 151a is rotated (counterclockwise in FIG. 4) by a driving device (not shown), the uppermost sheet P in the first sheet feeding cassette 151 is fed by the first sheet feeding roller 151a toward a sheet feeding passage 153 located on the right side of the image forming apparatus 500 while extending vertically. Similarly, when the second sheet feeding roller 152a is rotated (counterclockwise in FIG. 4) by a driving device (not shown), the uppermost sheet P in the second sheet feeding cassette 152 is fed by the second sheet feeding roller 152a toward the sheet feeding passage 153.

Plural pairs of feed rollers 154 are arranged in the sheet feeding passage 153. The recording medium sheet P fed into the sheet feeding passage 153 is fed from the lower side of the sheet feeding passage 153 to the upper side thereof while being pinched by the pairs of feed rollers 154.

A pair of registration rollers 55 is arranged on the downstream side of the sheet feeding passage 153 relative to the sheet feeding direction. When the pair of registration rollers 55 pinches the tip of the recording medium sheet P thus fed by the pairs of feed rollers 154, the pair of registration rollers 55 is stopped once, and is then rotated again to timely feed the recording medium sheet P to a secondary transfer nip mentioned below so that a combined color toner image on the intermediate transfer belt 14 is transferred onto the predetermined position of the recording medium sheet P.

The process cartridge of this disclosure includes at least an image bearer, and a cleaner to clean the surface of the image bearer, wherein the process cartridge is characterized in that the cleaner includes the above-mentioned cleaning blade, and the process cartridge is detachably attachable to an image forming apparatus as a single unit.

Each of the image forming units 1 is a process cartridge, which can be detachably attachable to the image forming apparatus 500. Namely, the process cartridge of this disclosure is the same as the image forming unit, which will be described below in detail.

Figure 5:
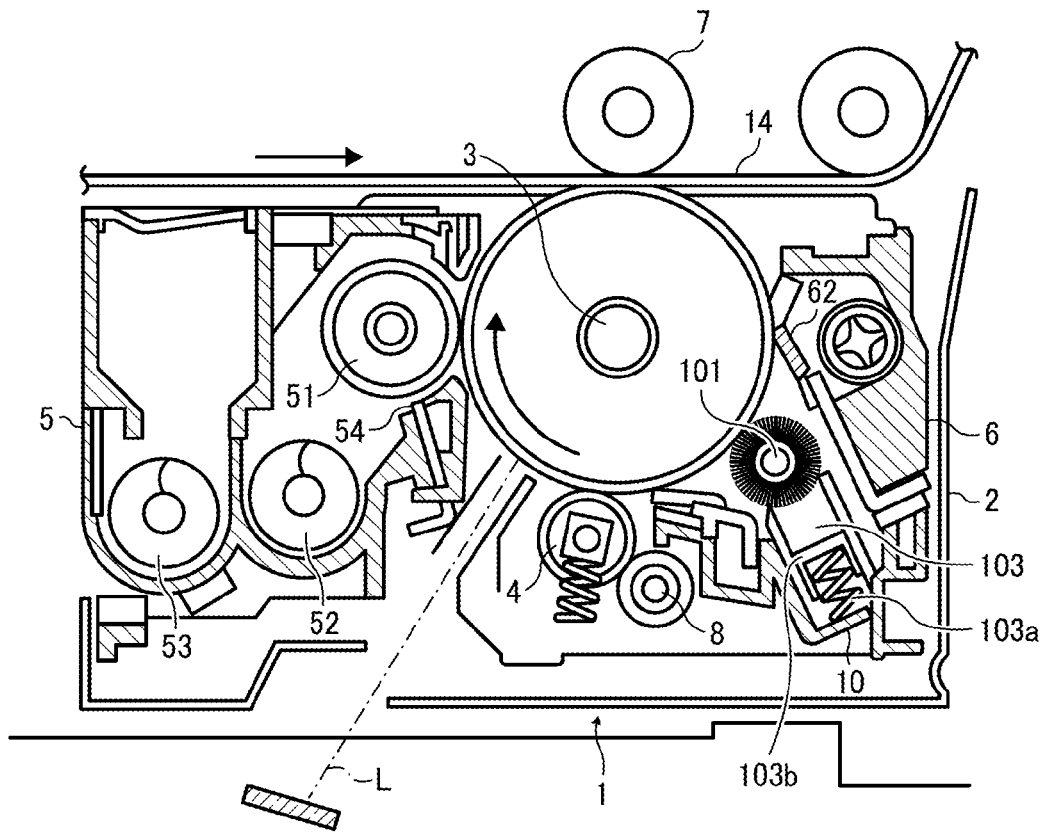
FIG. 5 is a schematic view illustrating an image forming unit of the image forming apparatus.

FIG. 5 is a schematic view illustrating one of the image forming units 1.

Referring to FIG. 5, the image forming unit 1 includes a drum-shaped photoconductor 3 serving as an image bearer. The shape of the photoconductor 3 is not limited to the drum-shape, and sheet-shaped or endless-belt-shaped photoconductors can also be used.

Around the photoconductor 3, a charging roller 4, a developing device 5, a primary transfer roller 7, a cleaner 6, a lubricant applicator 10, a discharging lamp (not shown), etc., are arranged. The charging roller 4 serves as a charger to charge a surface of the photoconductor 3. The developing device 5 develops an electrostatic latent image formed on the photoconductor 3 with a developer including a toner to form a toner image thereon. The primary transfer roller 7 serves as a primary transferring device to transfer the toner image on the photoconductor 3 to the intermediate transfer belt 14. The cleaner 6 removes residual toner from the surface of the photoconductor 3 after the toner image is transferred. The lubricant applicator 10 applies a lubricant to the surface of the photoconductor 3 after the surface is cleaned. The discharging lamp (not shown) serves as a discharger to decay residual charges remaining on the surface of the photoconductor 3 after the surface is cleaned.

The charging roller 4 is arranged in the vicinity of the photoconductor 3 with a predetermined gap therebetween, and evenly charges the photoconductor 3 so that the photoconductor 3 has a predetermined potential with a predetermined polarity. The thus evenly charged surface of the photoconductor 3 is irradiated with the light beam L emitted by the optical writing unit 40 based on image information, thereby forming an electrostatic latent image on the surface of the photoconductor 3.

The developing device 5 has a developing roller 51 serving as a developer bearer. A development bias is applied to the developing roller 51 by a power source (not shown). A supplying screw 52 and an agitating screw 53 are provided in a casing of the developing device 5 to feed the developer in opposite directions in the casing so that the developer is charged so as to have a charge with a predetermined polarity. In addition, a doctor 54 is provided in the developing device 5 to form a developer layer having a predetermined thickness on the surface of the developing roller 51. The toner in the developer layer, which has been charged so as to have a charge with the predetermined polarity, is adhered to an electrostatic latent image on the photoconductor 3 in a development region, in which the developing roller 51 is opposed to the photoconductor 3, resulting in formation of a toner image on the surface of the photoconductor 3.

The cleaner 6 includes a fur brush 101, the cleaning blade 62, etc. The cleaning blade 62 is contacted with the surface of the photoconductor 3 in such a manner as to counter the rotated photoconductor 3. The cleaning blade 62 will be described later in detail.

The lubricant applicator 10 includes a solid lubricant 103, and a pressing spring 103a to press the solid lubricant 103 toward the fur brush 101 so that the lubricant is transferred to the fur brush, and the fur brush applies the lubricant to the surface of the photoconductor 3. The solid lubricant 103 is supported by a bracket 103b while being pressed toward the fur brush 101 by the pressing spring 103a. The solid lubricant 103 is scraped by the fur brush 101, which is driven by the photoconductor 3 so as to rotate (counterclockwise in FIG. 5), thereby applying the lubricant 103 to the surface of the photoconductor 3. By thus applying the lubricant, the friction coefficient of the surface of the photoconductor 3 can be controlled so as to be not higher than 0.2 when no image is formed on the photoconductor.

Although the non-contact short-range charging roller 4 is used as the charger of the image forming unit 1, the charger is not limited thereto, and any known chargers such as contact chargers (such as contact charging rollers), corotrons, scorotrons, and solid state chargers can also be used for the charger. Among these chargers, contact chargers, and non-contact short-range chargers are preferable because of having advantages such that the charging efficiency is high, the amount of ozone generated in a charging operation is small, and the charger can be miniaturized.

Specific examples of light sources for use in the optical writing unit 40 include any known light emitting devices such as fluorescent lamps, tungsten lamps, halogen lamps, mercury lamps, sodium lamps, light emitting diodes (LEDs), laser diodes (LDs), and electroluminescent lamps (ELs).

In order to irradiate the photoconductor 3 with light having a wavelength in a desired range, sharp cut filters, bandpass filters, infrared cut filers, dichroic filters, interference filters, color temperature converting filters, and the like can be used.

Among these light sources, LEDs and LDs are preferably used because of having advantages such that the irradiation energy is high, and light having a relatively long wavelength of from 600 nm to 800 nm can be emitted.

The transfer unit 60 (illustrated in FIG. 4) serving as a transferring device includes not only the intermediate transfer belt 14, but also a belt cleaning unit 162, a first bracket 63, and a second bracket 64. In addition, the transfer units 60 further includes four primary transfer rollers 7Y, 7C, 7M and 7K, a secondary transfer backup roller 66, a driving roller 67, a supplementary roller 68, and a tension roller 69. The intermediate transfer belt 14 is rotated (counterclockwise in FIG. 5) in an endless manner by the driving roller 67 while being tightly stretched by the eight rollers. The four primary transfer rollers 7Y, 7C, 7M and 7K press the thus rotated intermediate transfer belt 14 toward the photoconductors 3Y, 3C, 3M and 3K, respectively, to form four primary transfer nips. In addition, a transfer bias having a polarity opposite to that of the charge of the toner is applied to the backside (i.e., inner surface) of the intermediate transfer belt 14 (for example, a positive bias is applied when a negative toner is used). Since the intermediate transfer belt 14 is rotated endlessly, yellow, cyan, magenta and black toner images, which are formed on the photoconductors 3Y, 3C, 3M and 3K, respectively, are sequentially transferred onto the intermediate transfer belt 14 so as to be overlaid, resulting in formation of a combined color toner image on the intermediate transfer belt 14.

The secondary transfer backup roller 66 and a secondary transfer roller 70 sandwich the intermediate transfer belt 14 to form a secondary transfer nip. As mentioned above, the pair of registration rollers 55 pinches the transfer paper sheet P once, and then timely feeds the paper sheet P toward the secondary transfer nip so that the combined color toner image on the intermediate transfer belt 14 is transferred onto a predetermined position of the recording medium sheet P. Specifically, the entire combined color toner image is transferred due to a secondary transfer electric field formed by the secondary transfer backup roller 66 and the secondary transfer roller 70, to which a secondary transfer bias is applied, and a nip pressure applied between the secondary transfer roller 70 and the transfer backup roller 66, resulting in formation of a full color toner image on the recording medium sheet P having white color.

After passing the secondary transfer nip, the intermediate transfer belt 14 bears residual toners (i.e., toners not transferred to the recording medium sheet P) on the surface thereof. The belt cleaning unit 162 removes the residual toners from the surface of the intermediate transfer belt 14. Specifically, a belt cleaning blade 162a of the belt cleaning unit 162 is contacted with the surface of the intermediate transfer belt 14 to removes the residual toners therefrom.

A first bracket 63 of the transfer unit 60 is rotated at a predetermined rotation angle on a rotation axis of the supplementary roller 68 by being driven by an on/off operation of a solenoid (not shown). When a monochromatic image is formed, the image forming apparatus 500 slightly rotates the first bracket 63 (counterclockwise in FIG. 4) by driving the solenoid. When the first bracket 63 is thus rotated, the primary transfer rollers 7Y, 7C and 7M are moved counterclockwise around the rotation axis of the supplementary roller 68, thereby separating the intermediate transfer belt 14 from the photoconductors 3Y, 3C and 3M. Thus, only the black image forming unit 1K is operated (without driving the color image forming units 1Y, 1C and 1M) to form a monochromatic image. By using this method, the life of the parts of the color image forming units 1Y, 1C and 1M can be prolonged.

As illustrated in FIG. 4, a fixing unit 80 is provided above the secondary transfer nip. The fixing unit 80 includes a pressure/heat roller 81 having a heat source (such as a halogen lamp) therein, and a fixing belt unit 82. The fixing belt unit 82 includes an endless fixing belt 84 serving as a fixing member, a heat roller 83 having a heat source (such as a halogen lamp) therein, a tension roller 85, a driving roller 86, a temperature sensor (not shown), etc. The endless fixing belt 84 is rotated (counterclockwise in FIG. 4) in an endless manner by the driving roller 86 while being tightly stretched by the heat roller 83, the tension roller 85, and the driving roller 86. When the fixing belt 84 is thus rotated endlessly, the fixing belt is heated by the heat roller 83 from the backside thereof. The pressure/heat roller 81 is contacted with the front surface of the fixing belt 84 while pressing the fixing belt 84 to the heat roller 83, resulting in formation of a fixing nip between the pressure/heat roller 81 and the fixing belt 84.

A temperature sensor (not shown) is provided so as to be opposed to the front surface of the fixing belt 84 with a predetermined gap therebetween to detect the temperature of the fixing belt 84 at a location just before the fixing nip. The detection data are sent to a fixing device supply circuit (not shown). The fixing device supply circuit performs ON/OFF control on the heat source in the heat roller 83 and the heat source in the pressure/heat roller 81.

The recording medium sheet P passing the secondary transfer nip and separated from the intermediate transfer belt 14 is fed to the fixing unit 80. When the recording medium sheet P bearing the unfixed full color toner image thereon is fed from the lower side of the fixing unit 80 to the upper side thereof while being sandwiched by the fixing belt 14 and the pressure/heat roller 81, the recording medium sheet P is heated by the fixing belt 84 while being pressed by the pressure/heat roller 81, resulting in fixation of the full color toner image on the recording medium sheet P.

The recording medium sheet P thus subjected to the fixing treatment is ejected from the main body of the image forming apparatus 500 by a pair of ejection rollers 87 so as to be stacked on a surface of a stacking portion 88, which is arranged on the upper surface of the main body of the image forming apparatus.

Four toner cartridges 100Y, 100C, 100M and 100K respectively containing yellow, cyan, magenta and black color toners are provided above the transfer unit 60 to supply the yellow, cyan, magenta and black color toners to the corresponding developing devices 5Y, 5C, 5M and 5K of the image forming units 1Y, 1C, 1M and 1K, if necessary. These toner cartridges 100Y, 100C, 100M and 100K can be detachably attachable to the main body of the image forming apparatus 500 independently of the image forming units 1Y, 1C, 1M and 1K.

Next, the image forming operation of the image forming apparatus 500 will be described by reference to FIGS. 4 and 5.

Upon receipt of a print execution signal from an operating portion (not shown) such as an operation panels, predetermined voltages or currents are applied to the charging roller 4 and the developing roller 51 at predetermined times. Similarly, predetermined voltages or currents are applied to the light sources of the optical writing unit 40 and the discharging lamp. In synchronization with these operations, the photoconductors 3 are rotated in a direction indicated by an arrow (illustrated in FIG. 5) by a driving motor (not shown).

When the photoconductors 3 are rotated, the surfaces thereof are charged by the corresponding charging rollers 4 so as to have predetermined potentials. Next, light beams L (such as laser beams) emitted by the optical writing unit 40 according to the image information irradiate the charged surfaces of the photoconductors 3, thereby forming electrostatic latent images on the surface of the photoconductors 3.

The surfaces of the photoconductors 3 bearing the electrostatic latent images are rubbed by magnetic brushes of the respective developers formed on the respective developing rollers 51. In this case, the (negatively-charged) toners on the developing rollers 51 are moved toward the electrostatic latent images by the development biases applied to the developing rollers 51, resulting in formation of Y, C, M and K toner images on the surface of the photoconductors 3Y, 3C, 3M and 3K.

Thus, each of the electrostatic latent images formed on the photoconductors 3 is subjected to reverse development using a negative toner. In this example, a negative-positive (N/P) developing method using a non-contact charging roller, in which the toner is adhered to a portion having a low potential, is used, but the developing method is not limited thereto.

The color toner images formed on the surfaces of the photoconductors 3Y, 3C, 3M and 3K are primarily transferred to the intermediate transfer belt 14 so as to be overlaid, thereby forming a combined color toner image of the four color toner images on the intermediate transfer belt 14.

The combined color toner image thus formed on the intermediate transfer belt 14 is transferred onto a predetermined portion of the recording medium sheet P, which is fed from the first or second sheet feeding cassette 151 or 152 and which is timely fed to the secondary transfer nip by the pair of registration rollers 55 after being pinched once thereby. After the recording medium sheet P bearing the combined color toner image thereon is separated from the intermediate transfer belt 14, the recording medium sheet P is fed to the fixing unit 80. When the recording medium sheet P bearing the combined color toner image thereon passes the fixing unit 80, the combined toner image is fixed to the recording medium sheet P upon application of heat and pressure thereto. The recording medium sheet P bearing the fixed combined color toner image (i.e., a full color image) thereon is ejected from the main body of the image forming apparatus 500, resulting in stacking on the surface of the stacking portion 88.

Toners remaining on the surface of the intermediate transfer belt 14 even after the combined color toner image thereon is transferred to the recording medium sheet P are removed therefrom by the belt cleaning unit 162.

Toners remaining on the surfaces of the photoconductors 3 even after the color toner images thereon are transferred to the intermediate transfer belt 14 are removed therefrom by the cleaner 6. Further, the surfaces of the photoconductors 3 are coated with a lubricant by the lubricant applicator 10, followed by a discharging treatment using a discharging lamp.

As illustrated in FIG. 5, the photoconductor 3, the charging roller 4, the developing device 5, the cleaner 6, the lubricant applicator 10, etc. are contained in a case 2 of the image forming unit 1 of the image forming apparatus 500. The image forming unit 1 is detachable attachable to the main body of the image forming apparatus 500 as a single unit (i.e., process cartridge). However, the image forming unit 1 is not limited thereto, and may have a configuration such that each of the members and devices such as the photoconductor 3, the charging roller 4, the developing device 5, the cleaner 6, and the lubricant applicator 10 is replaced with a new member or device.

In FIG. 5, numeral 8 denotes a charging roller cleaner to clean the surface of the charging roller 4.

Next, each of the members and devices of the image forming apparatus, and the process for which the member or device is used will be described in detail.

(Image Bearer)

The constituent, shape, structure, size, etc. of the image bearer (hereinafter sometimes referred to as a photoconductor) are not particularly limited, and are properly determined so that the image bearer fulfill the needs. For example, drum-shaped image bearers, and belt-shaped image bearers can be used. With respect to the constituent, inorganic photoconductors such as amorphous silicon and selenium, organic photoconductors such as polysilane, and phthalopolymethine, etc. can be used.

An example of organic photoconductors for use as the image bearer is a functionally-separated photoconductor which includes an electroconductive substrate, a charge generation layer, which includes at least a charge generation material and which is located on the electroconductive substrate, and a charge transport layer, which includes at least a charge transport material and which is located on the charge generation layer. In this regard, the charge generation layer and the charge transport layer serve as a photosensitive layer.

The method for preparing the charge generation layer is not particularly limited, and any known methods can be used. For example, a method in which a coating liquid including a charge generation material (such as phthalocyanine pigments, and bisazo pigments) and a binder resin, which are dispersed or dissolved in a solvent, is applied on an electroconductive substrate, followed by drying the coated liquid can be used.

The charge transport layer includes at least the charge transport material mentioned below, and is formed on the charge transport layer while the charge transport material is bound with a binder resin.

The method for preparing the charge transport layer is not particularly limited, and any known methods can be used. For example, a method in which a coating liquid including a charge transport material and a binder resin, which are dispersed or dissolved in a solvent, is applied on the charge generation layer, followed by drying the coated liquid can be used.

A reverse-type photoconductor in which a charge generation layer is located on the charge transport layer can also be used as the image bearer. In addition, a single-layer photoconductor, in which a photosensitive layer including a charge generation material and a charge transport material is located on an electroconductive substrate can also be used as the image bearer.

Specific examples of the material of the electroconductive substrate of the photoconductor include metals such as aluminum, brass, stainless steel, nickel, chromium, titanium, gold, silver, copper, tin, platinum, molybdenum, and indium; metal alloys of these metals; etc. The shape of the electroconductive substrate is not particularly limited, drum shape, and flexible shapes such as sheet shape, film shape, and belt shape are available. The electroconductive substrate may have an end or no end (i.e., be endless).

Among these, molded articles of aluminum alloys (such as JIS3000, JIS5000 and JIS6000), which are prepared by subjecting the metals to molding such as extrusion ironing (EI), extrusion drawing (ED), drawing ironing (DI) and impact ironing (II), are preferably used for the electroconductive substrate. The electroconductive substrate can be further subjected to a surface cutting treatment (such as diamond bite cutting), and a surface treatment such as polishing and anodization. Electroconductive cylindrical substrates, which are not subjected to such treatments, can also be used.

Resins can also be used for the electroconductive substrate. In this case, an electroconductive material such as metal powders and electroconductive carbon may be included therein. Alternatively, electroconductive resins can also be used. Glass can be used for the electroconductive substrate. In this case, the surface of glass is preferably covered with an electroconductive material such as tin oxide, indium oxide, and aluminum iodide so that the glass substrate has electroconductivity.

A resin layer can be formed on the surface of the electroconductive substrate so that the electroconductive substrate has good adhesiveness with the upper layer (such as charge generation layer) (i.e., adhesiveness enhancing function is performed); occurrence of flow current from the electroconductive substrate to the upper layer is prevented (i.e., barrier function is performed); and defects of the surface of the electroconductive substrate are covered (i.e., defect covering function is performed). Specific examples of such resins include polyethylene resins, acrylic resins, epoxy resins, polycarbonate resins, polyurethane resins, vinyl chloride resins, vinyl acetate resins, polyvinyl butyral resins, polyamide resins, nylon resins, alkyd resins, melamine resins, etc. These resins can be used alone or in combination. The resin layer can include a particulate material such as metal compounds, carbon, silica and resins, which is dispersed in the resin layer. Further, in order to improve properties of the photoconductor, another material such as pigments, electron acceptors, and electron donors can be included in the resin layer.

It is preferable to use, as a charge generation material, oxotitanium phthalocyanine, which has a maximum peak at a Bragg 2θ angle of 27.2±0.2° in the X-ray diffraction spectrum obtained by using CuKα, or a bisazo pigment having the following formula (1):

By using such an oxotitanium phthalocyanine or a bisazo pigment as mentioned above, a photoconductor which has a sensitivity in a long wavelength region and which exhibits high stability to withstand environmental conditions (e.g., humidity) can be produced.

In order that the photosensitive layer has good sensitivity in a desired wavelength region or the sensitivity of the photosensitive layer is enhanced, oxotitanium phthalocyanine and bisazo pigments other than the above-mentioned oxotitanium phthalocyanine and bisazo pigment can be used for the photosensitive layer. In addition, other materials such as monoazo pigments, bisazo pigments, trisazo pigments, polyazo pigments, indigo pigments, threne pigments, toluidine pigments, pyrazoline pigments, perylene pigments, quinacridone pigments, and pyrylium pigments can also be used for the photosensitive layer.

Specific examples of the material for use as the binder resin of the photosensitive layer include polycarbonate resins, styrene resins, acrylic resins, styrene-acrylic resins, ethylene-vinyl acetate resins, polypropylene resins, vinyl chloride resins, chlorinated polyether resins, vinyl chloride-vinyl acetate resins, polyester resins, furan resins, nitrile resins, alkyd resins, polyacetal resins, polymethylpentene resins, polyamide resins, polyurethane resins, epoxy resins, polyarylate resins, diarylate resins, polysulfone resins, polyether sulfone resins, polyaryl sulfone resins, silicone resins, ketone resins, polyvinyl butyral resins, polyether resins, phenolic resins, ethylene-vinyl acetate resins (EVA), acrylonitrile-chlorinated polyethylene-styrene resins (ACS), acrylonitrile-butadiene-styrene resins (ABS), epoxyacrylate resins, etc. These can be used alone or in combination.

It is preferable to use a mixture of resins having different molecular weight because a good combination of hardness and abrasion resistance can be imparted to the photosensitive layer. When the photosensitive layer includes a charge generation layer and a charge transport layer, the above-mentioned binder resins can be used for each of the layers. In this case, among various binder resins, polycarbonate resins, and polyarylate resins can be preferably used for the charge transport layer, and polycarbonate resins are more preferable.

When the photosensitive layer is formed, a coating method using a coating liquid is typically used.

The coating liquid includes a solvent in which such a charge generation material and/or a charge transport material as mentioned above is dissolved or dispersed. Specific examples of such a solvent include alcohols such as methanol, ethanol, n-propanol, i-propanol and butanol; saturated aliphatic hydrocarbons such as pentane, hexane, heptane,

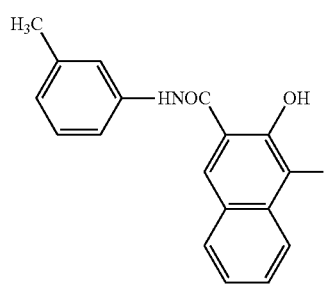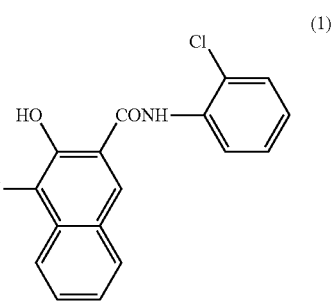

(1)

octane, cyclohexane and cycloheptane; aromatic hydrocarbons such as toluene and xylene; chlorinated hydrocarbons such as dichloromethane, dichloroethane, chloroform and chlorobenzene; ethers such as dimethyl ether, diethyl ether, tetrahydrofuran (THF), methoxy ethanol, dimethoxy ethane, dioxolane, dioxane, and anisole; ketones such as acetone, methyl ethyl ketone, methyl isobutyl ketone, and cyclohexanone; esters such as ethyl formate, propyl formate, methyl acetate, ethyl acetate, propyl acetate, butyl acetate and methyl propionate; and other solvents such as N,N-dimethylformamide and dimethylsulfoxide. These can be used alone or in combination.

Among these solvents, ketone solvents, ester solvents, ether solvents, and halogenated hydrocarbon are preferable.

The photoconductor for use in the image forming apparatus and the process cartridge of this disclosure preferably includes a charge transport material having one of the following formulae (2) and (3).

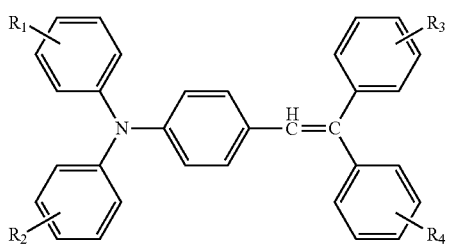

(2)

In formula (2), each of $R_1$ to $R_4$ independently represents a hydrogen atom, an alkyl group, which has 1 to 6 carbon atoms and which optionally includes a substituent, an alkoxy group having 1 to 6 carbon atoms.

Specific examples of the compounds having formula (2) are illustrated in Table 1 below, but are not limited thereto.

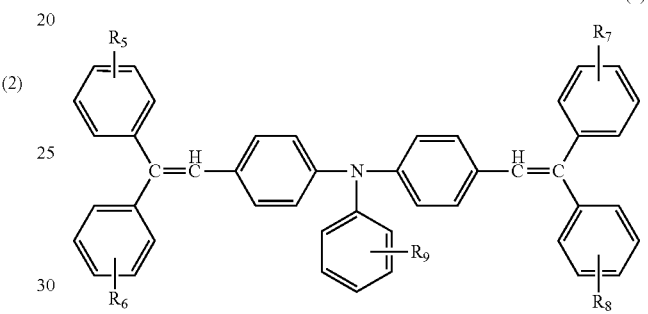

(3)

In formula (3), each of $R_5$ to $R_9$ independently represents a hydrogen atom, an alkyl group, which has 1 to 6 carbon atoms and which optionally includes a substituent, an alkoxy group having 1 to 6 carbon atoms.

Specific examples of the compounds having formula (3) are illustrated in Table 2 below, but are not limited thereto.

TABLE 1

| Charge transport material | $R_1$ | $R_2$ | $R_3$ | $R_4$ |
|---|---|---|---|---|
| No. 1-1 | Methyl group | Methyl group | Hydrogen atom | Hydrogen atom |
| No. 1-2 | Methyl group | Methyl group | Methyl group | Methyl group |
| No. 1-3 | Methyl group | Hydrogen atom | Methyl group | Hydrogen atom |
| No. 1-4 | Hydrogen atom | Hydrogen atom | Methyl group | Methyl group |
| No. 1-5 | Hydrogen atom | Hydrogen atom | Hydrogen atom | Hydrogen atom |

TABLE 2

| Charge transport material | $R_5$ | $R_6$ | $R_7$ | $R_8$ | $R_9$ |
|---|---|---|---|---|---|
| No. 2-1 | Methyl group | Methyl group | Methyl group | Methyl group | Methyl group |
| No. 2-2 | Methyl group | Methyl group | Methyl group | Methyl group | Hydrogen atom |
| No. 2-3 | Methyl group | Hydrogen atom | Methyl group | Hydrogen atom | Methyl group |
| No. 2-4 | Methyl group | Methyl group | Methyl group | Methyl group | Ethyl group |
| No. 2-5 | Hydrogen atom | Hydrogen atom | Hydrogen atom | Hydrogen atom | Hydrogen atom |

The content of the compound having formula (2) or (3) in the charge transport layer is preferably from 30 to 90 parts by weight, and more preferably from 40 to 80 parts by weight, based on 100 parts by weight of the binder resin included in the charge transport layer. When the content is less than 30 parts by weight, the electric properties of the photoconductor deteriorate (for example, the residual potential increases). In contrast, when the content is greater than 90 parts by weight, the mechanical properties of the photoconductor deteriorate (for example, the abrasion resistance deteriorates).

In addition, by including a particulate filler in the charge transport layer, the universal hardness and the elastic work of the photoconductor can be adjusted. Specific examples of such a particulate filler include particles of titanium oxide, silica, silicone rubbers, alumina, zinc oxide, zirconium oxide, tin oxide, indium oxide, antimony oxide, magnesium oxide, silicon nitride, boron nitride, calcium oxide, calcium carbonate, barium sulfate, silicone resins, polytetrafluoroethylene (PTFE) resins, tetrafluoroethylene-perfluoroalkoxyethylene (PFA) copolymers, etc.

Since the surface of the photoconductor is abraded when contacted with a recording medium (such as paper), a cleaning member, and a contact charger, it is preferable to adjust the universal hardness and the elastic work of the photosensitive layer while optimizing the composition of the photosensitive layer so that the resultant photosensitive layer has good abrasion resistance.

It is possible to use the charge transport material having formula (2) or (3) or another charge transport material alone or in combination. When a mixture charge transport material is used, the weight ratio (C/Co) of the charge transport material having formula (2) or (3) (C) to the other charge transport material (Co) is generally from 50/50 to 95/5, and preferably from 70/30 to 95/5.

Specific examples of other charge transport materials include electroconductive polymers such as polyvinyl carbazole, halogenated polyvinyl carbazole, polyvinyl pyrene, polyvinyl indoloquinoxaline, polyvinyl benzothiophene, polyvinyl anthracene, polyvinyl acridine, polyvinyl pyrazoline, polyacetylene, polythiophene, polypyrrole, polyphenylene, polyphenylenevinylene, polyisothianaphthene, polyaniline, polydiacetylene, polyheptadiene, polypyridinediyl, polyquinoline, polyphenylene sulfide, polyferrocenylene, polyperinaphthlene, and polyphthalocyanine; low molecular weight charge transport materials such as trinitrofluorenone, tetracyanoethylene, tetracyanoquinodimethane, quinone, diphenoquinone, naphthoquinone, anthraquinone and derivatives thereof, polycyclic aromatic compounds (e.g., anthracene, pyrene, and phenanthrene), and nitrogen-containing heterocyclic compounds (e.g., indole, carbazole and imidazole), fluorenone, fluorene, oxadiazole, oxazole, pyrazoline, hydrazone, triphenylmethane, triphenylamine, enamine and stilbene. In addition, polymeric solid electrolytes such that polymers such as polyethylene oxide, polypropylene oxide, polyacrylonitrile, and polymethacrylic acid are doped with a metal ion such as Li ion can be used. Further, organic charge transfer complexes (such as tetrathiafulvalene-tetracyanoquinodimethane), which are formed of an electron donating compound and an electron accepting compound can also be used.

These can be used alone or in combination so that the resultant photoconductor can have the desired properties.

The coating liquids used for preparing the layers of the photoconductor can include additives such as antioxidants, ultraviolet absorbents, radical scavengers, softening agents, hardeners, and crosslinking agents to enhance the optical properties, mechanical properties, and durability of the photoconductor. Particularly, when an antioxidant and an ultraviolet absorbent are used alone or in combination, the durability of the photoconductor can be enhanced. Among various antioxidants and ultraviolet absorbents, hindered phenol type antioxidants, amine type antioxidants, sulfur-containing antioxidants, and benzotriazole type ultraviolet absorbents are preferably used for the photosensitive layer of the photoconductor. Specific examples thereof include the following.

Specific examples of the phenol type antioxidants include monophenol compounds such as 2,6-di-t-butylphenol, 2,6-di-t-butyl-4-methoxyphenol, 2-t-butyl-4-methoxyphenol, 2,4-dimethyl-6-t-butylphenol, 2,6-di-t-butyl-4-methylphenol, butylated hydroxyanisole, β-(3,5-di-t-butyl-4-hydroxyphenyl)propionic acid stearyl ester, α-tocopherol, β-tocopherol, and n-octadecyl 3-(3',5'-di-t-butyl-4'-bydroxyphenyl)propionate; and polyphenol compounds such as 2,2'-methylenebis(6-t-butyl-4-methylphenol), 4,4'-butylidenebis(3-methyl-6-t-butylphenol), 4,4'-thiobis(6-t-butyl-3-methylphenol), 1,1,3-tris(2-methyl-4-hydroxy-5-t-butylphenyl)butane, 1,3,5-trimethyl-2,4,6-tris(3,5-di-t-butyl-4-hydroxybenzyl)benzene, and tetrakis[methylene-3-(3,5-di-t-butyl-4-hydroxyphenyl)propionate]methane.

These can be included alone or in combination for the photosensitive layer.

Specific examples of the amine type antioxidants include α,α'(tetrabenzyl)diamino-p-xylene, N-phenyl-1-naphthylamine, N-phenyl-N'-isopropyl-p-phenylenediamine, N,N-diethyl-p-phenylenediamine, N-phenyl-N'-ethyl-2-methyl-p-phenylenediamine, N-ethyl-N-hydroxyethyl-p-phenylenediamine, alkylated dipheylamine, N,N'-diphenyl-p-phenylenediamine, N,N'-diallyl-p-phenylenediamine, N-phenyl-1,3-dimethylbutyl-p-phenylenediamine, 4,4'-dioctyl-diphenylamine, 4,4'-dioctyl-diphenylamine, 6-ethoxy-2,2,4-trimethyl-1,2-dihydroquinoline, 2,2,4-trimethyl-1,2-dihydroquinoline, N-phenyl-β-naphthylamine, and N,N'-di-2-naphthyl-p-phenylenediamine.

These can be used alone or in combination for the photosensitive layer.

Specific examples of the sulfur-containing antioxidants include dilauryl 3,3-thiodipropionate, ditridecyl 3,3-thiodipropionate, dimyristyl 3,3-thiodipropionate, distearyl 3,3-thiodipropionate, laurylstearyl 3,3-thiodipropionate, bis[2-methyl-4-(3-n-alkyl(C12-C14)thiopropionate)-5-t-butylphenyl]sulfide, pentaerythritol tetra(β-laurylthiopropionate) ester, 2-mercaptobenzimidazole, and 2-mercapto-6-methylbenzimidazole. These can be used alone or in combination for the photosensitive layer.

Specific examples of the ultraviolet absorbents include benzotriazole compounds such as 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, and 2-(2'-hydroxy-5'-t-octylphenyl)benzotriazole; and salicylic acid compounds such as phenyl salicylate, p-t-butylphenyl salicylate, and p-octylphenyl salicylate.

These can be used alone or in combination for the photosensitive layer.

The added amount of each of such a phenol type antioxidant, an amine type antioxidant and an ultraviolet absorbent in a layer of the photoconductor is from 1 to 20% by weight based on the weight of the binder resin included in the layer. The added amount of such a sulfur-containing antioxidant in a layer of the photoconductor is from 0.1 to 5% by weight based on the weight of the binder resin included in the layer.

A protective layer can be formed on the photosensitive layer to enhance durability or other properties of the image bearer. Specific examples of such a protective layer include an organic thin layer of a resin such as polyvinyl formal resins, polycarbonate resins, fluorine-containing resins, polyurethane resins, and silicone resins, and a thin layer of a siloxane material formed by subjecting a silane coupling agent to hydrolysis.

(Charging Process, and Charger)

The charging process is a process in which a surface of the image bearer mentioned above is charged by such a charger as mentioned above. For example, the charging process can be performed by applying a voltage to the surface of the image bearer using a charger.

The charger is not particularly limited and any known chargers can be used. Specific examples thereof include contact chargers equipped with an electroconductive or semi-electroconductive member such as rollers, brushes, films and rubber blades; non-contact chargers such as corotrons and scorotrons, which utilize corona discharging; etc.

The shape of the charger is not particularly limited. Specific examples thereof include roller shape, brush shape (such as magnetic brush and fur brush), film shape, blade shape, etc., and a charger having a shape suitable for the image forming apparatus is used. When a magnetic brush is used, a charger including a magnetic brush of particles of a ferrite such as Zn—Cu ferrite, which serves as a charging member, a non-magnetic electroconductive sleeve to bear the magnetic brush thereon, and a magnet roller, which is located inside the sleeve so that the sleeve can bear the magnetic brush on the surface thereof, is typically used. When a brush is used, a charger including a fur whose surface is subjected to an electroconductive treatment using an electroconductive material such as carbon, copper sulfide, metals and metal oxides, and an electroconductive core member, which is made of a metal or a material subjected to an electroconductive treatment and to which the fur is attached, is typically used.

Among the chargers mentioned above, contact chargers have an advantage such that the amount of ozone generated by the chargers is relatively small.

It is preferable that such a charger as mentioned above is arranged while contacting or without contacting the surface of the image bearer, and a DC voltage or an AC-superimposed DC voltage is applied by the charger to charge the surface of the image bearer.

In addition, a short-range charger such that a charging roller is arranged so as to have a small gap with the surface of the image bearer using a gap tape, and a DC voltage or an AC-superimposed DC voltage is applied by the charging roller to charge the surface of the image bearer is also preferably used.

(Irradiating Process and Irradiator)

The irradiating process is a process in which the charged surface of the image bearer is irradiated with light according to image information using an irradiator such as the optical writing unit 40 mentioned above to form an electrostatic latent image on the image bearer.

The optical system used for the irradiator is broadly classified into analogue optical systems and digital optical systems. The analogue optical systems are such that the image of an original is directly projected to the charged surface of an image bearer by an optical system to form an electrostatic latent image on the image bearer. In contrast, the digital optical systems are such that image information is input as an electric signal, the electric signal is converted to an optical signal, and the charged surface of an image bearer with light of the optical signal, thereby forming an electrostatic latent image on the image bearer.

The irradiator is not particularly limited as long as the irradiator can irradiate the charged surface with light including information of image to be produced, and a proper irradiator suitable for the image forming apparatus is used. Specific examples of the irradiator include optical systems used for copiers, rod lens arrays, laser optical systems, optical systems using a liquid crystal shutter, LED (light emitting diode) optical systems, etc.

In the image forming apparatus of this disclosure, a back irradiating method in which the image bearer is irradiated with light including image information from the backside thereof can also be used.

(Developing Process and Developing Device)

The developing process is a process in which the electrostatic latent image mentioned above is developed with a developer including a toner using a developing device to form a visible image (toner image) on the surface of the image bearer.

The developing device is not particularly limited as long as the device can perform the developing process using a toner, and a proper device is selected from known developing devices. For example, a developing device including at least a developing member, which contains a toner and which applies the toner to an electrostatic latent image with or without contacting the toner to the electrostatic latent image, is preferably used.

The developing member may use a dry developing method or a wet developing method. In addition, the developing member may be a monochromatic developing member to develop an electrostatic latent image with a developer including a monochromatic toner to form a monochromatic image, or a multi-color developing member to develop electrostatic latent images with developers including color toners to form multiple color images. The developing member preferably has an agitator to agitate the toner to frictionally charge the toner, and a rotatable magnet roller to bear and feed the toner.

In the developing member, the developer including a toner and an optional carrier is agitated to charge the developer (toner), and the developer is born on the surface of the rotated magnet roller while erected thereon, thereby forming a magnetic brush on the surface of the magnet roller. Since the magnet roller is arranged in the vicinity of the image bearer, part of the toner in the magnetic brush is transferred to the electrostatic latent image by means of an electric attractive force, thereby developing the electrostatic latent image with the toner, resulting in formation of a visible image (toner image) on the surface of the image bearer.

The developer used for developing the electrostatic latent image may be a one-component developer consisting essentially of a toner, and a two-component developer including a toner and a carrier.

Next, the toner used for developing an electrostatic latent image will be described.

(Toner)

The toner typically includes toner particles (mother toner) and an external additive, and optionally includes other components.

The toner may be a monochromatic toner or a combination of color toners.

The toner particles include at least a binder resin and a colorant, and optionally include other components such as release agents and charge controlling agents.

(Binder Resin)

Specific examples of the binder resin include, but are not limited thereto, homopolymers of styrene or styrene derivatives such as polystyrene and polyvinyl toluene; copolymers of styrene and vinyl compounds such as styrene-p-chlorostyrene copolymers, styrene-propylene copolymers, styrene-vinyl toluene copolymers, styrene-methyl acrylate copolymers, styrene-ethyl acrylate copolymers, styrene-butyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ether copolymers, styrene-vinyl methyl ketone copolymers, styrene-butadiene copolymers, styrene-isoprene copolymers, styrene-maleic acid copolymers, and styrene-maleic acid ester copolymers; other resins such as polymethyl methacrylate, polybutyl methacrylate, polyvinyl chloride resins, polyvinyl acetate resins, polyethylene resins, polypropylene resins, polyester resins, polyurethane resins, epoxy resins, polyvinyl butyral resins, polyacrylic acid resins, rosins, modified rosins, terpene resins, phenolic resins, aliphatic or alicyclic hydrocarbon resins, aromatic petroleum resins, chlorinated paraffin, and paraffin waxes. These resins can be used alone or in combination.

Among these resins, polyester resins are preferable because of having advantages over styrene resins and acrylic resins that the resultant toner has good preservability while having a low melt viscosity.

Such polyester resins can be prepared by subjecting an alcohol component and a carboxylic acid component to a polycondensation reaction.

Specific examples of the alcohol component include, but are not limited thereto, diols such as polyethylene glycol, diethylene glycol, triethylene glycol, 1,2-propylene glycol, 1,3-propylene glycol, 1,4-butane diol, neopentyl glycol, and 1,4-butene diol; 1,4-bis(hydroxymethyl)cyclohexane, bisphenol A, hydrogenated bisphenol A, and etherified bisphenols such as polyoxyethylenated bisphenol A and polyoxypropylenated bisphenol A; dihydric alcohols in which the above-mentioned alcohols are substituted with a saturated or unsaturated hydrocarbon group having 3 to 22 carbon atoms; other dihydric alcohols; polyalcohols having three or more hydroxyl groups such as sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylol ethane, trimethylol propane, and 1,3,5-trihydroxymethylbenzene; etc.

Specific examples of the carboxylic acid component include, but are not limited thereto, monocarboxylic acids such as palmitic acid, stearic acid, and oleic acid; dibasic organic acids such as maleic acid, fumaric acid, mesaconic acid, citraconic acid, terephthalic acid, cyclohexanedicarboxylic acid, succinic acid, adipic acid, sebacic acid, malonic acid, dibasic organic acids in which these dibasic acids are substituted with a saturated or unsaturated hydrocarbon group having 3 to 22 carbon atoms, anhydrides and lower alkyl esters of these acids, and dimer acids of linolenic acid; polycarboxylic acids having three or more carboxyl groups such as 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 3,3-dicarboxymethylbutanoic acid, tetra(carboxymethyl)methane, 1,2,7,8-octanetetracarboxylic acid, EMPOL trimer acid, and anhydrides of these polycarboxylic acids; etc.

(Colorant)

The colorant included in the toner is not particularly limited, and any known dyes and pigments can be used. Specific examples of such dyes and pigments include carbon black, Nigrosine dyes, black iron oxide, NAPHTHOL YELLOW S, HANSA YELLOW 10G, HANSA YELLOW 5G, HANSA YELLOW G, Cadmium Yellow, yellow iron oxide, loess, chrome yellow, Titan Yellow, polyazo yellow, Oil Yellow, HANSA YELLOW GR, HANSA YELLOW A, HANSA YELLOW RN, HANSA YELLOW R, PIGMENT YELLOW L, BENZIDINE YELLOW G, BENZIDINE YELLOW GR, PERMANENT YELLOW NCG, VULCAN FAST YELLOW 5G, VULCAN FAST YELLOW R, Tartrazine Lake, Quinoline Yellow LAKE, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED F2R, PERMANENT RED F4R, PERMANENT RED FRL, PERMANENT RED FRLL, PERMANENT RED F4RH, Fast Scarlet VD, VULCAN FAST RUBINE B, Brilliant Scarlet G, LITHOL RUBINE GX, Permanent Red FSR, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE RS, INDANTHRENE BLUE BC, Indigo, ultramarine, Prussian Blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, etc. These materials are used alone or in combination.

The content of such a colorant in the toner is preferably from 1% to 15% by weight, and more preferably from 3% to 10% by weight of the toner.

Master batches, which are complexes of a colorant with a resin, can also be used as the colorant of the toner.

Specific examples of the resins used for such master batches include homopolymers of styrene or styrene derivatives, styrene copolymers, polymethyl methacrylate resins, polybutyl methacrylate resins, polyvinyl chloride resins, polyvinyl acetate resins, polyethylene resins, polypropylene resins, polyester resins, epoxy resins, epoxy polyol resins, polyurethane resins, polyamide resins, polyvinyl butyral resins, polyacrylic acid resins, rosin, modified rosins, terpene resins, aliphatic or alicyclic hydrocarbon resins, aromatic petroleum resins, chlorinated paraffin, paraffin, etc. These can be used alone or in combination.

(Release Agent)

The toner optionally includes a release agent. Known waxes and the like materials can be used as the release agent. Specific examples of the waxes include waxes having a carbonyl group, polyolefin waxes, and long-chain hydrocarbons. These can be used alone or in combination. Among these, waxes having a carbonyl group are preferable.

Specific examples of the waxes having a carbonyl group include esters of polyalkanoic acids (e.g., carnauba waxes, montan waxes, trimethylolpropane tribehenate, pentaerythritol tetrabehenate, pentaerythritol diacetate dibehenate, glycerin tribehenate, and 1,18-octadecanediol distearate); polyalkanol esters (e.g., tristearyl trimellitate, and distearyl maleate); polyalkanoic acid amides (e.g., dibehenyl amide); polyalkylamides (e.g., trimellitic acid tristearylamide); diallyl ketones (e.g., distearyl ketone); etc. Among these waxes having a carbonyl group, esters of polyalkanoic acids are preferable.

Specific examples of the polyolefin waxes include polyethylene waxes, polypropylene waxes, etc.

Specific examples of the long-chain hydrocarbons include paraffin waxes, SASOLWAX, etc.

The content of such a release agent in the toner is preferably from 5% to 15% by weight of the toner.

(Charge Controlling Agent)

The charge controlling agent optionally included in the toner is not particularly limited, and known charge controlling agents can be used. Specific examples thereof include Nigrosine dyes, triphenylmethane dyes, chromium-containing metal complex dyes, molybdic acid chelate pigments, Rhodamine dyes, alkoxyamines, quaternary ammonium salts, fluorine-containing quaternary ammonium salts, alkylamides, phosphorus and compounds thereof, tungsten and compounds thereof, fluorine-containing surfactants, salicylic acid metal salts, metal salts of salicylic acid derivatives, etc.

The content of such a charge controlling agent in the toner is preferably from 0.1 to 10 parts by weight, and more preferably from 0.2 to 5 parts by weight, based on 100 parts by weight of the toner.

(External Additive)

Specific examples of the external additive to be included in the toner include particulate inorganic materials such as silica, titanium oxide, alumina, silicon carbide, silicon nitride, and boron nitride; particulate resins such as particulate polymethyl methacrylate and polystyrene, which are prepared by a soap-free emulsion polymerization method and which have an average particle diameter of from 0.05 µm to 1 µm; etc. These can be used alone or in combination. The toner preferably includes at least a particulate silica as an external additive, and more preferably a particulate silica whose surface is hydrophobized.

Specific examples of such a hydrophobized silica include silicone-treated silica whose surface is treated with a silicone oil.

The surface treatment method is not particularly limited, and a proper method can be used. Specific examples of the silicone oil include dimethyl silicone oils, methylhydrodiene silicone oils, methylphenyl silicone oils, etc.

Marketed products of such a silicone-treated silica can be used. Specific examples thereof include RY 200, RY 200S, NY 50 and RY 50 which are from Nippon Aerosil Co. Ltd.

(Other Components)

The toner can optionally include other components such as fluidity improving agents, cleanability improving agents, magnetic materials, and metal soaps.

The fluidity improving agent performs a surface treatment on the toner to enhance the hydrophobicity of the toner to an extent such that deterioration of the fluidity and charging property of the toner under high humidity conditions can be prevented. Specific examples thereof include silane coupling agents, silylation agents, silane coupling agents having a fluorinated alkyl group, organic titanate coupling agents, aluminum-containing coupling agents, silicone oils, modified silicone oils, etc.

The cleanability improving agent enhances the cleanability of the toner to an extent such that residual toner particles remaining on an image bearer or an intermediate transfer medium are satisfactorily removed therefrom by a cleaner. Specific examples thereof include fatty acids and metal salts thereof such as stearic acid, zinc stearate, and calcium stearate; particulate polymers such as particulate polymethyl methacrylate, and particulate polystyrene, which are prepared by a soap-free emulsion polymerization method; etc. Among various particulate polymers, particulate polymers which have a relatively narrow particle diameter distribution and have a volume average particle diameter of from 0.01 µm to 1 µm are preferable.

The magnetic material is not particularly limited, and specific examples thereof include iron powders, magnetite, ferrite, etc. Among these, white magnetic materials are preferably used for the toner because such materials do not change the color tone of the toner.

(Toner Preparation Method)

Next, the method for preparing the toner will be described. The toner preparation method is not particularly limited, and any known toner preparation methods can be used. Specific examples thereof include kneading and pulverization methods, polymerization methods, solution suspending methods, spray-drying granulation methods, etc. Among various methods, suspension polymerization methods, emulsion polymerization methods, and dispersion polymerization methods are preferably used so that the resultant toner has high circularity and a small particle diameter, thereby enhancing the qualities of toner images.

Examples of the kneading and pulverization methods and the polymerization methods will be described.

(Kneading and Pulverization Method)

The kneading and pulverization method includes melting and kneading a toner composition including at least a binder resin and a colorant; cooling the kneaded material; pulverizing the kneaded and cooled material; and classifying the pulverized material to prepare toner particles.

In the melt kneading process, toner components such as the components mentioned above are mixed, and the mixture is melted and kneaded by a kneader. For example, single screw or twin screw continuous extruders, and batch kneaders such as roll mills can be used as the kneader. Specific examples of the kneader include KTK twin screw extruders from Kobe Steel, Ltd., TEM twin screw extruders from Toshiba Machine Co., Ltd., twin screw extruders from KCK Co., Ltd., PCM twin screw extruders from Ikegai Corp., and KO-KNEADER from Buss AG.

The melt kneading temperature is determined based on the softening point of the binder resin used for the toner. Specifically, when the melt kneading temperature is much higher than the softening point of the binder resin, a problem such that the polymer chain of the binder resin is cut is caused. In contrast, when the melt kneading temperature is much lower than the softening point of the binder resin, kneading (dispersing) of the toner components is not satisfactorily performed.

In the pulverization process, the melted and kneaded material is pulverized after being cooled. In this regard, it is preferable to crush the kneaded material initially, followed by pulverizing the crushed material. In the pulverization process, a method in which the crushed material is collided with a collision plate using jet air; a method in which the crushed material is collided with each other using jet air; and a method in which the crushed material is fed to a narrow gap between a rotor and a stator are preferably used.

In the classification process, the pulverized material (particles) is classified using a classifier to obtain particles having a desired average particle diameter. In this regard, it is preferable to remove fine particles using a cyclone, a decanter or a centrifugal separator.

In addition, it is preferable that after the pulverization and classification processes, the particles are fed into an air stream using a centrifugal force to be further classified to prepare particles (i.e., toner particles) having a predetermined average particle diameter. Thus, toner particles (mother toner) can be prepared.

The thus prepared toner particles are mixed with an external additive (such as particulate silica), and the mixture is agitated by a mixer so that the external additive is disintegrated and covers the surface of the toner particles. In this regard, it is preferable that the external additive is adhered to the toner particles evenly and strongly so that the toner has good durability.

(Polymerization Method)

In an example of the polymerization method for preparing the toner, a toner composition including at least a modified polyester resin capable of forming a urea bond or a urethane bond and a colorant is dissolved or dispersed in a solvent, and the solution or dispersion (hereinafter referred to as an oil phase liquid) is dispersed in an aqueous medium, followed by a polyaddition reaction. Next, the solvent is removed from the resultant dispersion to prepare particles, and the particles are washed to prepared toner particles.

An example of the modified polyester resin capable of forming a urea bond or a urethane bond is a polyester prepolymer having an isocyanate group, which can be prepared by reacting a carboxyl group or a hydroxyl group present at the end of a polyester resin with a polyisocyanate compound (PIC). The thus prepared polyester prepolymer is reacted with an amine or the like to prepare a modified polyester resin, whose molecular chain is crosslinked and/or grows. The thus prepared modified polyester resin is preferably used for the toner because a good combination of low temperature fixability and hot offset resistance can be imparted to the toner.

Specific examples of the polyisocyanate compounds (PIC) include aliphatic polyisocyanates (such as tetramethylene diisocyanate, hexamethylene diisocyanate, and 2,6-diisocyanato methylcaproate); alicyclic polyisocyanates (such as isophorone diisocyanate, and cyclohexylmethane diisocyanate); aromatic didicosycantes (such as tolylene diisocyanate, and diphenylmethane diisocyanate); aromatic aliphatic diisocyanates (such as α,α,α',α'-tetramethyl xylylene diisocyanate); isocyanurates; blocked polyisocyanates in which the polyisocyanates mentioned above are blocked with phenol derivatives, oximes or caprolactams; etc. These compounds can be used alone or in combination.

Suitable mixing ratio of a polyisocyanate (PIC) to a polyester having a hydroxyl group (i.e., an equivalence ratio [NCO]/[OH] of the isocyanate group of the polyisocyanate (PIC) to the hydroxyl group of the polyester) is from 5/1 to 1/1, preferably from 4/1 to 1.2/1, and more preferably from 2.5/1 to 1.5/1.

The average number of the isocyanate group included in a molecule of the polyester prepolymer (A) is not less than 1, preferably from 1.5 to 3, and more preferably from 1.8 to 2.5.

Specific examples of the amine (B) to be reacted with the polyester prepolymer (A) include diamines (B1), polyamines (B2) having three or more amino groups, amino alcohols (B3), amino mercaptans (B4), amino acids (B5), and blocked amines (B6) in which the amines (B1-B5) mentioned above are blocked.

Specific examples of the diamines (B1) include aromatic diamines (such as phenylenediamine, diethyltoluenediamine, and 4,4'-diaminodiphenyl methane); alicyclic diamines (such as 4,4'-diamino-3,3'-dimethyldicyclohexyl methane, diaminocyclohexane, and isophoronediamine); aliphatic diamines (such as ethylenediamine, tetramethylenediamine, and hexamethylenediamine); etc.

Specific examples of the polyamines (B2) having three or more amino groups include diethylenetriamine, triethylenetetramine, etc.

Specific examples of the amino alcohols (B3) include ethanolamine, hydroxyethylaniline, etc.

Specific examples of the amino mercaptans (B4) include aminoethyl mercaptan, aminopropyl mercaptan, etc.

Specific examples of the amino acids (B5) include aminopropionic acid, aminocaproic acid, etc.

Specific examples of the blocked amines (B6) include ketimine compounds which are prepared by reacting one of the amines B1-B5 mentioned above with a ketone such as acetone, methyl ethyl ketone, and methyl isobutyl ketone; oxazoline compounds; etc.

Among these compounds, diamines (B1), and mixtures of a diamine (B1) with a small amount of polyamine (B2) are preferable.

The mixing ratio of a polyester prepolymer (A) having an isocyanate group to an amine (B) (i.e., an equivalence ratio [NCO]/[NHx] of the isocyanate group of the polyester prepolymer (A) to the amino group of the amine) is from 1/2 to 2/1, preferably from 1.5/1 to 1/1.5, and more preferably from 1.2/1 to 1/1.2.

By using such a polymerization method as mentioned above, a spherical toner having a small particle diameter can be prepared at low costs while reducing the environmental load.

Known dispersers can be used for dispersing the oil phase liquid in the aqueous medium. Suitable dispersers include low speed shear dispersers, high speed shear dispersers, friction dispersers, high pressure jet dispersers, ultrasonic dispersers, etc.

Among these dispersers, high speed shear dispersers are preferable because the particle diameter of the droplets of the oil phase liquid dispersed in the aqueous medium can be controlled so as to be from 2 μm to 20 μm.

When high speed shear dispersers are used, the revolution of the rotor is not particularly limited, but the revolution is generally from 1,000 rpm to 30,000 rpm, and preferably from 5,000 rpm to 20,000 rpm. The dispersion time is not particularly limited, but when a batch disperser is used, the dispersion time is generally from 0.1 minutes to 5 minutes. The dispersion temperature is preferably from 0° C. to 150° C. and preferably from 40° C. to 98° C. It is preferable that the dispersion temperature is relatively high, because the oil phase liquid has low viscosity, and therefore the oil phase liquid can be easily dispersed in the aqueous medium.

The amount of the aqueous medium in which the oil phase liquid is to be dispersed is generally from 50 to 2,000 parts by weight, and preferably from 100 to 1,000 parts by weight, based on 100 parts by weight of the toner composition.

In order to remove the organic solvent from the dispersion prepared by dispersing the oil phase liquid in the aqueous medium, a method in which the dispersion is gradually heated to evaporate the organic solvent included in the droplets of the oil phase liquid can be used. Alternatively, a method in which the dispersion is sprayed in a dry environment to dry the organic solvent included in the droplets of the oil phase liquid can also be used.

By removing the organic solvent from the dispersion, toner particles (i.e., mother toner) can be prepared. The toner particles can be subjected to a washing treatment, a drying treatment, and a classifying treatment. The classifying treatment can be performed on the dispersion, in which the toner particles are dispersed, using a classifier such as cyclones, decanters and classifiers utilizing centrifuge so that fine particles of the toner particles are removed from the dispersion. The classifying treatment can also be performed after the toner particles are dried.

The thus prepared toner particles are mixed with an external additive (such as the above-mentioned external additives). In addition, if desired, the toner particles can be mixed with a particulate charge controlling agent or the like. In this regard, by applying a mechanical impact force, particles of the external additive and the charge controlling agent can be prevented from releasing from the surface of the toner particles.

Suitable mechanical impact force application methods include methods in which a mechanical impact force is applied to a mixture of the toner particles and the external additive by a highly rotated blade, and methods in which the mixture is put into a high speed airstream to collide the particles with each other or a collision plate.

Specific examples of such mechanical impact applicators include ONG MILL (manufactured by Hosokawa Micron Co., Ltd.), modified I TYPE MILL in which the pressure of air used for pulverizing is reduced (manufactured by Nippon Pneumatic Mfg. Co., Ltd.), HYBRIDIZATION SYSTEM (manufactured by Nara Machine Co., Ltd.), KRYPTRON SYSTEM (manufactured by Kawasaki Heavy Industries, Ltd.), automatic mortars, etc.

The toner preferably has a circularity of not less than 0.97 so that the toner has good transferability and can produce high quality images without dust particle (i.e., without background development such that the background of an image is soiled with toner particles).

The circularity of toner can be measured by a flow type particle image analyzer FPIA-1000 from Sysmex Corporation.

The volume average particle diameter of the toner is not particularly limited, but is preferably not greater than 5.5 μm.

The ratio (Dv/Dn) of the volume average particle diameter (Dv) of the toner to the number average particle diameter (Dn) thereof is preferably from 1.00 to 1.40. In this regard, when the ratio (Dv/Dn) approaches 1.00, the toner has sharper (narrower) particle diameter distribution. Toner having a small particle diameter and such sharp particle diameter distribution has sharp charge quantity distribution, and therefore can produce high quality images without background development. In addition, when the toner is used for an electrostatic transfer method in which a toner image is electrostatically transferred, the image transfer rate can be increased.

The volume average particle diameter and the particle diameter distribution can be determined by an instrument using a COULTER COUNTER method such as COULTER COUNTER TA-II or COULTER MULTISIZER II, which are manufactured by Beckman Coulter Inc.

When the thus prepared toner is used for a two-component developer, the toner is mixed with a carrier. In this regard, the weight ratio (T/C) of the toner (T) to the carrier (C) is preferably from 1/100 to 10/100.

Specific examples of the carrier include iron powders, ferrite powders, magnetite powders, and magnetic resin powders, which have a particle diameter of from 20 μm to 200 μm.

The carrier can be covered with a resin. Specific examples of the resin include urea-formaldehyde resins, melamine resins, benzoguanamine resins, urea resins, polyamide resins, epoxy resins, acrylic resins, polymethyl methacrylate resins, polyacrylonitirile resins, polyvinyl acetate resins, polyvinyl alcohol resins, polyvinyl butyral resins, polystyrene resins, styrene-acrylic copolymers, halogenated olefin resins (such as polyvinyl chloride resins), polyester resins (such as polyethylene terephthalate resins and polybutylene terephthalate resins), polycarbonate resins, polyethylene resins, polyvinyl fluoride resins, polyvinylidene fluoride resins, polytrifluoroethylene resins, polyhexafluoropropylene resins, copolymers of vinylidenefluoride and an acrylic monomer, vinylidene fluoride-vinyl fluoride copolymers, terpolymers of tetrafluoroethylene, vinylidene fluoride and other monomers including no fluorine atom, silicone resins, etc.

If desired, an electroconductive powder may be included in the resin layer covering the carrier. Specific examples of such electroconductive powders include metal powders, carbon black powders, titanium oxide powders, tin oxide powders, zinc oxide powders, etc. The average particle diameter of such electroconductive powders is preferably not greater than 1 μm so that the electric resistance of the resultant carrier can be satisfactorily controlled.

The toner can be used as a one-component magnetic developer, which does not use a carrier and which includes a magnetic material, or a one-component non-magnetic developer, which does not use a carrier and which does not include a magnetic material.

(Transferring Process and Transferring Device)

The transferring process is a process in which the visible image (toner image) is transferred onto a recording medium. Among various transferring processes, a transferring process in which the visible image is primarily transferred to an intermediate transfer medium, and the visible image is then secondarily transferred to a recording medium is preferable. Further, a transferring process in which two or more color toner images (preferably full color toner images) are primarily transferred to an intermediate transfer medium to form a combined color toner image on the intermediate transfer medium (i.e., primary transfer process), and the combined color toner image is transferred to a recording medium (i.e., secondary transfer process) is more preferable.

The transferring process can be performed by charging the image bearer on the image bearer using a transferring device to transfer the visible image (e.g., toner image) to a recording medium. It is preferable that the transferring device includes a primary transferring device to transfer the visible image to an intermediate transfer medium, and a secondary transferring device to transfer the visible image on the intermediate transfer medium to a recording medium. It is more preferable that the primary transferring device transfers multiple color toner images to form a combined color toner image (such as full color toner image) on the intermediate transfer medium, and the secondary transferring device transfers the combined color toner image to the recording medium.

The intermediate transfer medium is not particularly limited, and for example, a transfer belt or the like can be used.

The transferring device (primary and secondary transferring devices) preferably includes at least a transferring member to charge the visible image on the image bearer so that the visible image is peeled therefrom and transferred to the recording medium (or intermediate transfer medium). In addition, the transferring device can include one or more transferring members. Specific examples of such a transferring member include transferring members using corona charging, transferring belts, transferring rollers, pressure transferring rollers, adhesive transferring members, etc.

Plain papers are typically used for the recording medium, but the recording medium is not limited thereto and any materials can be used as long as a visible image (e.g., toner images) can be transferred thereto. For example, polyethylene terephthalate (PET) films for use in OHP (overhead projection) can also be used as the recording medium.

(Fixing Process and Fixing Device)

The fixing process is a process in which the toner image transferred to the recording medium is fixed thereto by a fixing device. When two or more color toners are transferred to the recording medium, the fixing process can be performed on each color toner image or a combined color toner image consisting of the two or more color toners. The fixing device is not particularly limited, and any known fixing devices such as heat and pressure fixing devices using a heating member and a pressing member can be used.

Specific examples of the heat and pressure fixing devices include fixing devices using a heat roller and a pressure roller, and fixing devices using a heat roller, a pressure roller, and an endless belt. The fixing temperature is not particularly limited, and is set to a proper temperature depending on the properties of the toner used and image forming conditions of the image forming apparatus. However, the fixing temperature is preferably from 80° C. to 200° C. If desired, a light fixing member can be used in combination with such fixing devices as mentioned above.

(Cleaning Process and Cleaner)

The cleaning process is a process in which toner particles remaining on the image bearer are removed therefrom by a cleaner. The cleaning process can be satisfactorily performed by using a cleaner using the cleaning blade of this disclosure.

The cleaning blade is preferably contacted with the surface of the member to be cleaned (such as image bearer) at a pressure of from 10 N/m to 100 N/m. In addition, the angle between the elastic member of the cleaning blade and the tangent line at a point of the image bearer, at which the cleaning blade is contacted with the image bearer, is not particularly limited, but is preferably from 65° to 85°.

(Other Processes and Devices Therefor)

Specific examples of other processes (and devices therefor) include a discharging process (a discharger), a recycling process (a recycling device), a controlling process (a controller), etc.

(Discharging Process and Discharger)

The discharging process is a process in which a discharge bias is applied by a discharger to the image bearer to remove residual charges from the image bearer.

The discharger is not particularly limited, and any dischargers can be used as long as the dischargers can apply a discharge bias to the image bearer. Specific examples of the discharger include discharge lamps.

(Recycling Process and Recycling Device)

The recycling process is a process in which the toner collected by the cleaner is fed by a recycling device to the developing device to be recycled.

The recycling device is not particularly limited, and for example, known powder feeders can be used therefor.

(Controlling Process and Controller)

The controlling process is a process in which the above-mentioned processes are controlled by a controller.

The controller is not particularly limited as long as the controller can control the above-mentioned devices, and for example, sequencers and computers can be used therefor.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The evaluation methods of the below-mentioned cleaning blades are the following.

1. JIS A Hardness of Elastic Member

The JIS-A hardness is measured by the method described in JIS K6253 while using a micro rubber hardness tester MD-1, which is manufactured by KOBUNSHI KEIKI CO., LTD. and which uses a pressing plate and a pressing needle and determines hardness of a sample based on the travel distance of the pressing needle.

When the elastic member consists of two different elastic strips which are overlaid, the hardness of each elastic strip is measured.

2. Impact Resilience Coefficient of Elastic Member

The impact resilience coefficient of the elastic member is measured by using a resilience tester No. 221 manufactured by Toyo Seiki Seisakusho, Ltd., and a method described in JIS K6255. In this regard, two or more pieces of the elastic member (which has a thickness of about 2 mm) are overlapped so that the elastic member (i.e., the sample to be measured) has a thickness of not less than 4 mm.

3. Thickness of Elastic Member

After the elastic member is cut with a razor in the thickness direction, the cross-section of the elastic member was visually observed with a microscope VHX-100 from Keyence Corporation to determine the thickness of the elastic member.

4. Average Circularity of Toner

The average circularity of the toner is measured using a flow particle image analyzer FPIA-2000 from Sysmex Corp. The procedure is the following.

(1) Initially, 100 to 150 ml of water, from which solid foreign materials have been removed, a dispersant (preferably 0.1 to 0.5 ml of a surfactant (e.g., alkylbenzene sulfonate)), and 0.1 to 0.5 g of a sample (i.e., toner) are mixed to prepare a dispersion (suspension);

(2) The suspension is further subjected to a supersonic dispersing treatment for 1 to 3 minutes using a supersonic disperser to prepare a dispersion including particles of the sample at a concentration of from 3,000 to 10,000 pieces/4

(3) The thus prepared dispersion is set in the analyzer so that the particles pass through a detection area formed on a plate in the analyzer; and (4) The particles of the sample passing through the detection area are optically detected by a CCD camera, and then the shapes of the toner particles and the distribution of the shapes are analyzed by an image analyzer to determine the average circularity of the sample.

Figure 6A:
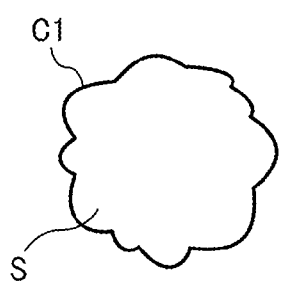
FIGS. 6A and 6B are views for use in describing the way to measure the circularity of toner.
Figure 6B:
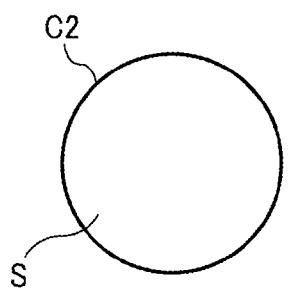

The method for determining the circularity of a particle is described in FIGS. 6A and 6B. Specifically, when the projected image of a particle has a perimeter $C1$ and an area $S$ as illustrated in FIG. 6A, and the perimeter of a circle having the same area $S$ is $C2$ as illustrated in FIG. 6B, the circularity of the particle can be obtained by the following equation.

$$\text{Circularity} = C2/C1$$

The average circularity of a toner can be obtained by averaging circularities of particles of the toner.

5. Volume Average Particle Diameter of Toner

The volume average particle diameter of the toner is determined by a COULTER COUNTER method using an instrument, COULTER MULTISIZER 2e manufactured by Beckman Coulter Inc. Specifically, the number-size particle diameter distribution data and the volume-basis particle diameter distribution data are sent to a personal computer via an interface manufactured by Nikkaki Bios Co., Ltd. to be analyzed. Specifically, the procedure is the following.

(1) A surfactant serving as a dispersant, preferably 0.1 to 5 ml of a 1% aqueous solution of an alkylbenzenesulfonic acid salt, is added to 100 to 150 ml of an electrolyte, which is a 1% aqueous solution of first class NaCl;

(2) Two (2) to 20 milligrams of a sample (toner) to be measured is added into the mixture;

(3) The mixture is subjected to an ultrasonic dispersing treatment for about 1 to 3 minutes to prepare a dispersion;

(4) The dispersion is added to 100 to 200 ml of the aqueous solution of the electrolyte in a beaker so that the mixture includes the particles at a predetermined concentration; and
(5) The thus diluted dispersion is set in the instrument to measure particle diameters of 50,000 particles using an aperture of 100 μm to determine the volume average particle diameter of the sample.

When measuring the volume average particle diameter, the following 13 channels are used:
(1) Not less than 2.00 μm and less than 2.52 μm;
(2) Not less than 2.52 μm and less than 3.17 μm;
(3) Not less than 3.17 μm and less than 4.00 μm;
(4) Not less than 4.00 μm and less than 5.04 μm;
(5) Not less than 5.04 μm and less than 6.35 μm;
(6) Not less than 6.35 μm and less than 8.00 μm;
(7) Not less than 8.00 μm and less than 10.08 μm;
(8) Not less than 10.08 μm and less than 12.70 μm;
(9) Not less than 12.70 μm and less than 16.00 μm;
(10) Not less than 16.00 μm and less than 20.20 μm;
(11) Not less than 20.20 μm and less than 25.40 μm;
(12) Not less than 25.40 μm and less than 32.00 μm; and
(13) Not less than 32.00 μm and less than 40.30 μm.

Namely, particles having a particle diameter of from 2.00 μm to 40.30 μm are targeted.

In this regard, the volume average particle diameter is obtained by the following equation:

$$\text{Volume average particle diameter} = \Sigma XfV/\Sigma fV,$$

wherein X represent the representative particle diameter of each channel, V represents the volume of the particle having the representative particle diameter, and f represents the number of particles having particle diameters in the channel.

Elastic Member Raw Material Preparation Example 1

Preparation of Elastic Member Raw Material 1

Preparation of Polyurethane Liquid A

The following components were mixed to prepare a prepolymer component.

| | |
|---|---|
| Diphenylmethane diisocyanate (p-MDI) | 48.56 parts |
| Polycaprolactone diol prepared by using a linear glycol as an initiator (PCL210N from Daicel Chemical Industries, Ltd., which has a number average molecular weight of 1,000) | 51.44 parts |

The following components were mixed to prepare a hardener component.

| | |
|---|---|
| Polycaprolactone diol prepared by using a linear glycol as an initiator (PCL210N from Daicel Chemical Industries, Ltd.) | 40.82 parts |
| Trimethylol propane (TMP) | 3.34 parts |
| 1,4-Butanediol (4-BD) | 5.22 parts |

The prepolymer component and the hardener component were mixed to prepare a polyurethane liquid A.

Preparation of Polyurethane Elastic Member Raw Material 1

A polyurethane elastic member raw material 1 having a single-layered structure was prepared by molding the above-prepared polyurethane liquid A.

The JIS A hardness and the impact resilience coefficient of the elastic member raw material 1 were 68° and 30%, respectively.

The elastic member raw material 1 was cut so as to have an average thickness of 2.0 mm, a length of 11.5 mm, and a width (i.e., "W" in FIG. 3) of 32.6 mm.

Elastic Member Raw Material Preparation Example 2

Preparation of Elastic Member Raw Material 2

Preparation of Polyurethane Liquid A

The procedure for preparation of the polyurethane liquid A in Elastic Member Raw Material Preparation Example 1 was repeated to prepare the polyurethane liquid A.

Preparation of Polyurethane Liquid D

The following components were mixed to prepare a prepolymer component.

| | |
|---|---|
| Diphenylmethane diisocyanate (p-MDI) | 43.12 parts |
| Polycaprolactone diol prepared by using a linear glycol as an initiator (PCL220N from Daicel Chemical Industries, Ltd., which has a number average molecular weight of 2,000) | 56.88 parts |

The following components were mixed to prepare a hardener component.

| | |
|---|---|
| Polycaprolactone diol prepared by using a linear glycol as an initiator (PCL220N from Daicel Chemical Industries, Ltd.) | 63.82 parts |
| Trimethylol propane (TMP) | 1.93 parts |
| 1,4-Butanediol (4-BD) | 6.97 parts |

The prepolymer component and the hardener component were mixed to prepare a polyurethane liquid D.

Preparation of Polyurethane Elastic Member Raw Material 2

Each of the polyurethane liquids A and D was molded to prepare two elastic plates A and D, and a polyurethane elastic member raw material 2 having a double-layered structure was prepared by laminating the two elastic plates A and D.

The JIS A hardness of one of the elastic plates of the elastic member raw material 2 to be contacted with the member to be cleaned was 80°, and the JIS A hardness of the other side of the elastic member 2 was 75°. The impact resilience coefficient of the elastic member raw material 2 was 25%. In this regard, the elastic plate to be contacted with the member to be cleaned was the elastic plate A, which was made from the polyurethane liquid A.

The elastic member raw material 2 was cut so as to have an average thickness of 2.0 mm, a length of 11.5 mm, and a width (i.e., "W" in FIG. 3) of 32.6 mm.

Ultraviolet Curable Composition Preparation Example 1

The following components were mixed to prepare a liquid including a curable monomer (i.e., ultraviolet curable composition 1).

| | |
|---|---|
| Tricyclodecane dimethanol diacrylate (A-DCP from Shin-Nakamura Chemical Co., Ltd., which has the below-mentioned formula (4) and which has two functional groups and a molecular weight of 304) | 50 parts |

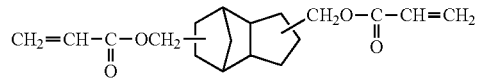

(4)

$$CH_2=CH-\underset{\underset{O}{\|}}{C}-OCH_2-[\text{tricyclodecane}]-CH_2O-\underset{\underset{O}{\|}}{C}-CH=CH_2$$

| | |
|---|---|
| Polymerization initiator (1-hydroxycyclohexyl phenyl ketone, IRGACURE 184 from Ciba Specialty Chemicals (BASF)) | 5 parts |
| Cyclohexanone (solvent) | 55 parts |

Thus, an ultraviolet curable composition 1 was prepared.

Ultraviolet Curable Composition Preparation Example 2

The following components were mixed to prepare a liquid including a curable monomer (i.e., ultraviolet curable composition 2).

| | |
|---|---|
| Acrylate compound having an adamantane structure (X-DA from Idemitsu Kosan Co., Ltd., which is a reaction product of 1,3-adamantane and acrylic acid and has the below-mentioned formula (5) and which has two functional groups and a molecular weight of 276) | 50 parts |

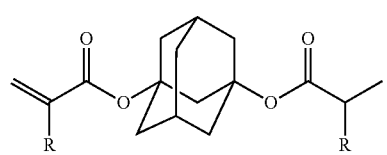

(5)

wherein R represents a hydrogen atom.

| | |
|---|---|
| Polymerization initiator (1-hydroxycyclohexyl phenyl ketone, IRGACURE 184 from Ciba Specialty Chemicals (BASF)) | 5 parts |
| Cyclohexanone (solvent) | 55 parts |

Thus, an ultraviolet curable composition 2 was prepared.

Ultraviolet Curable Composition Preparation Example 3

The following components were mixed to prepare a liquid including a curable monomer (i.e., ultraviolet curable composition 3).

| | |
|---|---|
| Acrylate compound having an adamantane structure (1,3-adamantane dimethanol diacrylate, X-A-201 from Idemitsu Kosan Co., Ltd., which has the below-mentioned formula (6) and which has two functional groups and a molecular weight of from 304) | 50 parts |

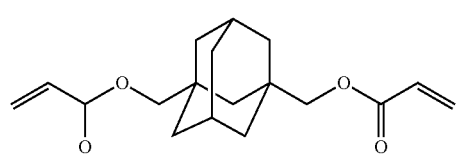 [SMILES: C=CC(=O)OCC12CC3CC(C1)CC(COC(O)C=C)(C3)C2]

(6)

| | |
|---|---|
| Polymerization initiator (1-hydroxycyclohexyl phenyl ketone, IRGACURE 184 from Ciba Specialty Chemicals (BASF)) | 5 parts |
| Cyclohexanone (solvent) | 55 parts |

Thus, an ultraviolet curable composition 3 was prepared.

Ultraviolet Curable Composition Preparation Example 4

The following components were mixed to prepare a liquid including a curable monomer (i.e., ultraviolet curable composition 4).

| | |
|---|---|
| Acrylate compound having an adamantane structure (DIAPUREST ADTM from Mitsubishi Gas Chemical Company Inc., which has the below-mentioned formula (7) and which has three functional groups and a molecular weight of from 388) | 50 parts |

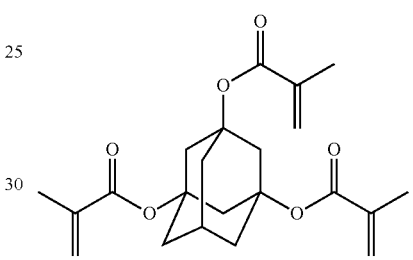

(7)

| | |
|---|---|
| Polymerization initiator (1-hydroxycyclohexyl phenyl ketone, IRGACURE 184 from Ciba Specialty Chemicals (BASF)) | 5 parts |
| Cyclohexanone (solvent) | 55 parts |

Thus, an ultraviolet curable composition 4 was prepared.

Ultraviolet Curable Composition Preparation Example 5

The following components were mixed to prepare a liquid including a curable monomer (i.e., ultraviolet curable composition 5).

| | |
|---|---|
| Tricyclodecane dimethanol diacrylate (A-DCP from Shin-Nakamura Chemical Co., Ltd., which has the above-mentioned formula (4) and which has two functional groups and a molecular weight of 304) | 25 parts |
| Pentaerythritol triacrylate (PETIA from DAICEL-CYTEC Co., Ltd., which has the below-mentioned formula (8) and which has three functional groups and a molecular weight of 298) | 25 parts |

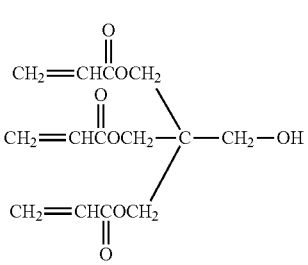

(8)

$$\begin{array}{c} CH_2=CHCOCH_2 \\ \underset{O}{\|} \\ CH_2=CHCOCH_2-C-CH_2-OH \\ \underset{O}{\|} \\ CH_2=CHCOCH_2 \\ \underset{O}{\|} \end{array}$$

-continued

| | |
|---|---|
| Polymerization initiator<br>(1-hydroxycyclohexyl phenyl ketone, IRGACURE 184 from<br>Ciba Specialty Chemicals (BASF)) | 5 parts |
| Cyclohexanone (solvent) | 55 parts |

Thus, an ultraviolet curable composition 5 was prepared.

Ultraviolet Curable Composition Preparation Example 6

The following components were mixed to prepare a liquid including a curable monomer (i.e., ultraviolet curable composition 6).

| | |
|---|---|
| Acrylate compound having an adamantane structure<br>(1,3-adamantane dimethanol diacrylate, X-A-201 from Idemitsu<br>Kosan Co., Ltd., which has the above-mentioned formula (6)<br>and which has two functional groups and a molecular weight of<br>from 304) | 25 parts |
| Pentaerythritol triacrylate<br>(PETIA from DAICEL-CYTEC Co., Ltd., which has the above-<br>mentioned formula (8) and which has three functional groups<br>and a molecular weight of 298) | 25 parts |
| Polymerization initiator<br>(1-hydroxycyclohexyl phenyl ketone, IRGACURE 184 from<br>Ciba Specialty Chemicals (BASF)) | 5 parts |
| Cyclohexanone (solvent) | 55 parts |

Thus, an ultraviolet curable composition 6 was prepared.

Toner Preparation Example

A toner composition including a modified polyester resin capable of forming a urea bond and a urethane bond, and a colorant was dissolved or dispersed in an organic solvent to prepare a toner composition liquid. The toner composition liquid was dispersed in an aqueous medium while subjected to a polyaddition reaction to prepare a dispersion. After the organic solvent was removed from the dispersion, the particles of the dispersion were washed, thereby forming toner particles, which were prepared by a polymerization method. It was confirmed that the toner particles (i.e., mother toner) have an average circularity of 0.98, and a volume average particle diameter of 4.9 μm. Next, 100 parts of the toner particles were mixed by a HENSCHEL MIXER mixer with 1.5 parts of a particulate silica having a relatively small particle diameter (H2000 from Clariant Japan K.K., 0.5 parts of a particulate titanium oxide having a relatively small particle diameter (MT-150AI from Tayca Corp., and 1.0 part of a silica with a relatively large particle diameter, UFP-30H from Denki Kagaku Kogyo K.K. Thus, a toner was prepared.

Example 1

Preparation of Cleaning Blade 1

The above-prepared ultraviolet curable composition 1 was diluted with a diluent (cyclohexanone) to prepare a coating liquid having a solid content of 50% by weight. After the tip portion of the above-prepared elastic member raw material 1 was dipped into (i.e., impregnated with) the coating liquid to a depth of 2 mm for 5 minutes, the elastic member raw material 1 was pulled from the coating liquid and then dried in air for 3 minutes. Thereafter, the coated elastic member raw material 1 was irradiated with ultraviolet rays using an ultraviolet irradiator UVC-2534/1MNLC3 from Ushio, Inc. under conditions of 140 W in power, 5 m/min in irradiation speed, and 5 passes in number of repetition of irradiation. Next, the elastic member raw material 1 was dried by a thermal drier for 15 minutes at 100° C. Thus, an elastic member 1', which includes a cured material in the tip portion thereof, was prepared.

It was confirmed that the tip portion (i.e., L1 in FIG. 3) of the elastic blade 1', which is defined as a portion ranging in length in the longitudinal direction of the cleaning blade from 0 to 500 μm from a tip surface thereof, has a maximum thickness ($t_M$) of 2.0010 mm, and the rear portion (i.e., L2 in FIG. 3) of the elastic blade 1' other than the tip portion has an average thickness ($t_A$) of 2.0000 mm. In this elastic member 1', the increasing rate (IR), which is defined as ($[(t_M-t_A)/t_A]\times 100$), was 0.0500%. Namely, the maximum thickness ($t_M$) of the tip portion L1 of the elastic member 1' is greater than the average thickness ($t_A$) of the rear portion thereof by 0.0500%.

The cleaning blade 1 was evaluated as follows.

1. Image Quality

The elastic member 1' was fixed to a metal plate holder with an adhesive to prepare a cleaning blade 1. The cleaning blade 1 was set to a color copier (IMAGIO MP C5001 from Ricoh Co., Ltd.). In this regard, the lubricant applicator of the color copier was detached from the color copier.

After the toner prepared above was set to the color copier, a running test in which 50,000 copies of an A-4 size original image, which has an image area proportion of 5% and includes a belt-shaped solid image, are produced in such a manner as 2 prints per job was performed under an environmental condition of 23° C. and 50% RH.

After the running test, the 50,000$^{th}$ image was visually observed to determine whether the image has defective images.

2. Eversion of Tip Edge Portion of Cleaning Blade

The cleaning blade was set on a layer formed on a glass plate, which layer is the same as the outermost layer of the photoconductor of the color copier, while moved under the predetermined conditions (i.e., at a pressure in the above-mentioned proper range of from 10 N/m to 100 N/m (i.e., in a proper digging amount) and at an angle of from 65° to 85°), and the tip edge portion of the cleaning blade contacted with the glass plate was visually observed from the opposite side of the glass plate using a CCD camera (CM-5 from Nikon Corporation) to determine whether or not the tip edge portion is everted as illustrated in FIG. 2A.

3. Abrasion Loss

Figure 7:
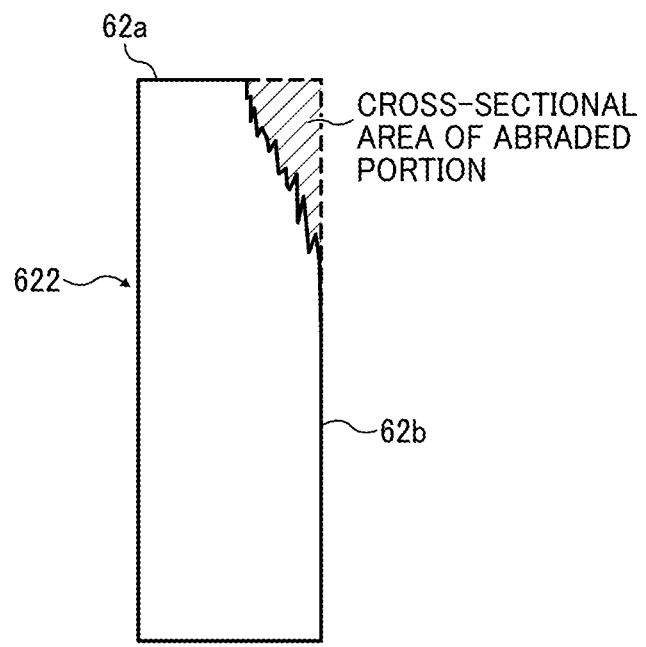
FIG. 7 is a schematic view for use in describing abrasion of a tip edge of a cleaning blade.

After the running test, the width of the abraded tip edge portion 62c of the cleaning blade 62 was measured (i.e., whether the tip edge portion 62c is abraded as illustrated in FIG. 7) using a laser microscope VK-9510 from Keyence Corp. FIG. 7 illustrates a cleaning blade whose tip edge portion is abraded to an extent such that the shape of the portion is changed.

As a result of the evaluation, it was found that the cleaning blade 1 does not cause eversion of the tip edge portion and abrasion thereof, and can produce high quality images in the running test while maintaining good cleanability.

The properties and evaluation results of the cleaning blade 1 are described in Table 3 below.

Example 2

Preparation of Cleaning Blade 2

The procedure for preparation of the elastic member 1' in Example 1 was repeated except that the dipping time (i.e., impregnation time) was changed from 5 minutes to 30 minutes to prepare an elastic member 2'.

It was confirmed that the tip portion (i.e., L1 in FIG. 3) of the elastic blade 2', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 2' other than the tip portion has an average thickness ($t_A$) of 2.0000 mm. In this elastic member 2', the increasing rate (IR), which is defined as ($[(t_M-t_A)/t_A] \times 100$), was 0.5000%. Namely, the maximum thickness ($t_M$) of the tip portion L1 of the elastic member 2' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 2' to prepare and evaluate a cleaning blade 2.

As a result of the evaluation, it was found that the cleaning blade 2 does not cause eversion of the tip edge portion and abrasion thereof, and can produce high quality images over a long period of time in the running test while maintaining good cleanability.

The properties and evaluation results of the cleaning blade 2 are described in Table 3 below.

Example 3

Preparation of Cleaning Blade 3

The procedure for preparation of the elastic member 1' in Example 1 was repeated except that the dipping time (i.e., impregnation time) was changed from 5 minutes to 60 minutes to prepare an elastic member 3'.

It was confirmed that the tip portion (i.e., L1 in FIG. 3) of the elastic blade 3', which is defined as a portion ranging in length in the longitudinal direction of the cleaning blade from 0 to 500 μm from a tip surface thereof, has a maximum thickness ($t_M$) of 2.0400 mm, and the rear portion (i.e., L2 in FIG. 3) of the elastic blade 3' other than the tip portion has an average thickness ($t_A$) of 2.0000 mm. In this elastic member 3', the increasing rate (IR), which is defined as ($[(t_M-t_A)/t_A] \times 100$), was 2.0000%. Namely, the maximum thickness ($t_M$) of the tip portion L1 of the elastic member 3' is greater than the average thickness ($t_A$) of the rear portion thereof by 2.0000%.

In addition, the procedure for preparation and evaluation of the cleaning blade 1 in Example 1 was repeated except that the elastic member 1' was replaced with the elastic member 3' to prepare and evaluate a cleaning blade 3.

As a result of the evaluation, it was found that the cleaning blade 3 does not cause eversion of the tip edge portion and abrasion thereof, and can produce high quality images over a long period of time in the running test while maintaining good cleanability.

The properties and evaluation results of the cleaning blade 3 are described in Table 3 below.

Example 4

Preparation of Cleaning Blade 4

The procedure for preparation of the elastic member 1' in Example 1 was repeated except that the elastic member raw material 1 was replaced with the above-prepared elastic member raw material 2 to prepare an elastic member 4'.

It was confirmed that the tip portion (i.e., L1 in FIG. 3) of the elastic blade 4', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 4' other than the tip portion has an average thickness ($t_A$) of 2.0000 mm. In this elastic member 4', the increasing rate (IR), which is defined as ($[(t_M-t_A)/t_A] \times 100$), was 0.5000%. Namely, the maximum thickness ($t_M$) of the tip portion L1 of the elastic member 4' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 4' to prepare and evaluate a cleaning blade 4.

As a result of the evaluation, it was found that the cleaning blade 4 does not cause eversion of the tip edge portion and abrasion thereof, and can produce high quality images over a long period of time in the running test while maintaining good cleanability.

The properties and evaluation results of the cleaning blade 4 are described in Table 3 below.

Example 5

Preparation of Cleaning Blade 5

The procedure for preparation of the elastic member 1' in Example 1 was repeated except that the ultraviolet curable composition 1 was replaced with the above-prepared ultraviolet curable composition 2, and the dipping time (i.e., impregnation time) was changed from 5 minutes to 30 minutes to prepare an elastic member 5'.

It was confirmed that the tip portion (i.e., L1 in FIG. 3) of the elastic blade 5', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 5' other than the tip portion has an average thickness ($t_A$) of 2.0000 mm. In this elastic member 5', the increasing rate (IR), which is defined as ($[(t_M-t_A)/t_A] \times 100$), was 0.5000%. Namely, the maximum thickness ($t_M$) of the tip portion L1 of the elastic member 5' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 5' to prepare and evaluate a cleaning blade 5.

As a result of the evaluation, it was found that the cleaning blade 5 does not cause eversion of the tip edge portion and abrasion thereof, and can produce high quality images over a long period of time in the running test while maintaining good cleanability.

The properties and evaluation results of the cleaning blade 5 are described in Table 3 below.

Example 6

Preparation of Cleaning Blade 6

The procedure for preparation of the elastic member 1' in Example 1 was repeated except that the ultraviolet curable composition 1 was replaced with the above-prepared ultraviolet curable composition 3, and the dipping time (i.e., impregnation time) was changed from 5 minutes to 30 minutes to prepare an elastic member 6'.

It was confirmed that the tip portion (i.e., L1 in FIG. 3) of the elastic blade 6', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 6' other than the tip portion has an average thickness ($t_A$) of 2.0000 mm. In this elastic member 6', the increasing rate (IR), which is defined as ($[(t_M-t_A)/t_A]\times 100$), was 0.5000%. Namely, the maximum thickness ($t_M$) of the tip portion L1 of the elastic member 6' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 6' to prepare and evaluate a cleaning blade 6.

As a result of the evaluation, it was found that the cleaning blade 6 does not cause eversion of the tip edge portion and abrasion thereof, and can produce high quality images over a long period of time in the running test while maintaining good cleanability.

The properties and evaluation results of the cleaning blade 6 are described in Table 3 below.

Example 7

Preparation of Cleaning Blade 7

The procedure for preparation of the elastic member 1' in Example 1 was repeated except that the ultraviolet curable composition 1 was replaced with the above-prepared ultraviolet curable composition 4, and the dipping time (i.e., impregnation time) was changed from 5 minutes to 30 minutes to prepare an elastic member 7'.

It was confirmed that the tip portion (i.e., L1 in FIG. 3) of the elastic blade 7', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 7' other than the tip portion has an average thickness ($t_A$) of 2.0000 mm. In this elastic member 7', the increasing rate (IR), which is defined as ($[(t_M-t_A)/t_A]\times 100$), was 0.5000%. Namely, the maximum thickness ($t_M$) of the tip portion L1 of the elastic member 7' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 7' to prepare and evaluate a cleaning blade 7.

As a result of the evaluation, it was found that the cleaning blade 7 does not cause eversion of the tip edge portion and abrasion thereof, and can produce high quality images over a long period of time in the running test while maintaining good cleanability.

The properties and evaluation results of the cleaning blade 7 are described in Table 3 below.

Example 8

Preparation of Cleaning Blade 8

The procedure for preparation of the elastic member 1' in Example 1 was repeated except that the ultraviolet curable composition 1 was replaced with the above-prepared ultraviolet curable composition 5, and the dipping time (i.e., impregnation time) was changed from 5 minutes to 30 minutes to prepare an elastic member 8'.

It was confirmed that the tip portion (i.e., L1 in FIG. 3) of the elastic blade 8', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 8' other than the tip portion has an average thickness ($t_A$) of 2.0000 mm. In this elastic member 8', the increasing rate (IR), which is defined as ($[(t_M-t_A)/t_A]\times 100$), was 0.5000%. Namely, the maximum thickness ($t_M$) of the tip portion L1 of the elastic member 8' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 8' to prepare and evaluate a cleaning blade 8.

As a result of the evaluation, it was found that the cleaning blade 8 does not cause eversion of the tip edge portion and abrasion thereof, and can produce high quality images over a long period of time in the running test while maintaining good cleanability.

The properties and evaluation results of the cleaning blade 8 are described in Table 3 below.

Example 9

Preparation of Cleaning Blade 9

The procedure for preparation of the elastic member 1' in Example 1 was repeated except that the ultraviolet curable composition 1 was replaced with the above-prepared ultraviolet curable composition 6, and the dipping time (i.e., impregnation time) was changed from 5 minutes to 30 minutes to prepare an elastic member 9'.

It was confirmed that the tip portion (i.e., L1 in FIG. 3) of the elastic blade 9', which is defined as a portion ranging in length in the longitudinal direction of the cleaning blade from 0 to 500 μm from a tip surface thereof, has a maximum thickness ($t_M$) of 2.0100 mm, and the rear portion (i.e., L2 in FIG. 3) of the elastic blade 9' other than the tip portion has an average thickness ($t_A$) of 2.0000 mm. In this elastic member 9', the increasing rate (IR), which is defined as ($[(t_M-t_A)/t_A]\times 100$), was 0.5000%. Namely, the maximum thickness ($t_M$) of the tip portion L1 of the elastic member 9' is greater than the average thickness ($t_A$) of the rear portion thereof by 0.5000%.

In addition, the procedure for preparation and evaluation of the cleaning blade 1 in Example 1 was repeated except that the elastic member 1' was replaced with the elastic member 9' to prepare and evaluate a cleaning blade 9.

As a result of the evaluation, it was found that the cleaning blade 9 does not cause eversion of the tip edge portion and abrasion thereof, and can produce high quality images over a long period of time in the running test while maintaining good cleanability.

The properties and evaluation results of the cleaning blade 9 are described in Table 3 below.

Comparative Example 1

Preparation of Cleaning Blade 10

The procedure for preparation of the elastic member 1' in Example 1 was repeated except that the elastic member raw material 1 was not dipped into the ultraviolet curable composition 1 to prepare an elastic member 10'.

It was confirmed that the tip portion (i.e., L1 in FIG. 3) of the elastic blade 10', which is defined as a portion ranging in length in the longitudinal direction of the cleaning blade from 0 to 500 μm from a tip surface thereof, has a maximum thickness ($t_M$) of 2.0000 mm, and the rear portion (i.e., L2 in FIG. 3) of the elastic blade 10' other than the tip portion has an average thickness ($t_A$) of 2.0000 mm. In this elastic member 10', the increasing rate (IR), which is defined as ($[(t_M-t_A)/t_A]\times$ 100), was 0.0000%. Namely, the maximum thickness ($t_M$) of the tip portion L1 of the elastic member 10' is the same as the average thickness ($t_A$) of the rear portion thereof.

In addition, the procedure for preparation and evaluation of the cleaning blade 1 in Example 1 was repeated except that the elastic member 1' was replaced with the elastic member 10' to prepare and evaluate a cleaning blade 10.

As a result of the evaluation, it was found that the cleaning blade 10 causes eversion of the tip edge portion and abrasion thereof, and produces defective images with 4 to 5 abnormal streak images in the running test due to deterioration of cleanability.

The properties and evaluation results of the cleaning blade 10 are described in Table 3 below.

Comparative Example 2

Preparation of Cleaning Blade 11

The procedure for preparation of the elastic member 1' in Example 1 was repeated except that the dipping time was changed from 5 minutes to 1.5 minutes to prepare an elastic member 11'.

It was confirmed that the tip portion (i.e., L1 in FIG. 3) of the elastic blade 11', which is defined as a portion ranging in length in the longitudinal direction of the cleaning blade from 0 to 500 μm from a tip surface thereof, has a maximum thickness ($t_M$) of 2.0005 mm, and the rear portion (i.e., L2 in FIG. 3) of the elastic blade 11' other than the tip portion has an average thickness ($t_A$) of 2.0000 mm. In this elastic member 11', the increasing rate (IR), which is defined as ($[(t_M-t_A)/t_A]\times 100$), was 0.0250%. Namely, the maximum thickness ($t_M$) of the tip portion L1 of the elastic member 11' is greater than the average thickness ($t_A$) of the rear portion thereof by 0.0250%.

In addition, the procedure for preparation and evaluation of the cleaning blade 1 in Example 1 was repeated except that the elastic member 1' was replaced with the elastic member 11' to prepare and evaluate a cleaning blade 11.

As a result of the evaluation, it was found that the cleaning blade 11 causes eversion of the tip edge portion and abrasion thereof, and produces defective images with one abnormal streak image in the running test due to deterioration of cleanability.

The properties and evaluation results of the cleaning blade 11 are described in Table 3 below.

Comparative Example 3

Preparation of cleaning blade 12

The procedure for preparation of the elastic member 1' in Example 1 was repeated except that the dipping time was changed from 5 minutes to 120 minutes to prepare an elastic member 12'.

It was confirmed that the tip portion (i.e., L1 in FIG. 3) of the elastic blade 12', which is defined as a portion ranging in length in the longitudinal direction of the cleaning blade from 0 to 500 μm from a tip surface thereof, has a maximum thickness ($t_M$) of 2.0800 mm, and the rear portion (i.e., L2 in FIG. 3) of the elastic blade 12' other than the tip portion has an average thickness ($t_A$) of 2.0000 mm. In this elastic member 12', the increasing rate (IR), which is defined as ($[(t_M-t_A)/t_A]\times 100$), was 4.0000%. Namely, the maximum thickness ($t_M$) of the tip portion L1 of the elastic member 12' is greater than the average thickness ($t_A$) of the rear portion thereof by 4.0000%.

In addition, the procedure for preparation and evaluation of the cleaning blade 1 in Example 1 was repeated except that the elastic member 1' was replaced with the elastic member 12' to prepare and evaluate a cleaning blade 12.

As a result of the evaluation, it was found that the cleaning blade 12 causes eversion of the tip edge portion and abrasion thereof, and produces defective images with 2 abnormal weak streak images in the running test due to deterioration of cleanability.

The properties and evaluation results of the cleaning blade 12 are described in Table 3 below.

TABLE 3

| | Cleaning blade | | | | | | | | | |
|---|---|---|---|---|---|---|---|---|---|---|
| | | Elastic member raw material | | | | | | | | |
| | | Number of | Elastic member prepared by dipping the elastic member into ultraviolet curable composition | | | | | | | |
| | Number of cleaning blade | elastic member raw material | Number of elastic member | Number of ultraviolet curable composition | Dipping time (min) | Maximum thickness ($t_M$) (μm) | Average thickness ($t_A$) (μm) | Increasing rate (IR)* (%) | Image quality | Occurrence of eversion | Abrasion |
| Ex. 1 | 1 | 1 | 1' | 1 | 5 | 2.0010 | 2.0000 | 0.0500 | Good | No | No abrasion. |
| Ex. 2 | 2 | 1 | 2' | 1 | 30 | 2.0100 | 2.0000 | 0.5000 | Good | No | Good cleanability was maintained over a long period of time. |
| Ex. 3 | 3 | 1 | 3' | 1 | 60 | 2.0400 | 2.0000 | 2.0000 | Good | No | |
| Ex. 4 | 4 | 2 | 4' | 1 | 5 | 2.0100 | 2.0000 | 0.5000 | Good | No | |
| Ex. 5 | 5 | 1 | 5' | 2 | 30 | 2.0100 | 2.0000 | 0.5000 | Good | No | |
| Ex. 6 | 6 | 1 | 6' | 3 | 30 | 2.0100 | 2.0000 | 0.5000 | Good | No | |
| Ex. 7 | 7 | 1 | 7' | 4 | 30 | 2.0100 | 2.0000 | 0.5000 | Good | No | |
| Ex. 8 | 8 | 1 | 8' | 5 | 30 | 2.0100 | 2.0000 | 0.5000 | Good | No | |
| Ex. 9 | 9 | 1 | 9' | 6 | 30 | 2.0100 | 2.0000 | 0.5000 | Good | No | |
| Comp. Ex. 1 | 10 | 1 | 10' | — | — | 2.0000 | 2.0000 | 0.0000 | Images with 4 to 5 clear streak images | Yes | The abutment part (tip edge portion) was abraded. |
| Comp. Ex. 2 | 11 | 1 | 11' | 1 | 1.5 | 2.0005 | 2.0000 | 0.0250 | Images with one clear streak image | Yes | Poor cleanability. |

TABLE 3-continued

| | | Cleaning blade | | | | | | | | |
|---|---|---|---|---|---|---|---|---|---|---|
| | | Elastic member raw material | | | | | | | | |
| | | Number of elastic member raw material | Elastic member prepared by dipping the elastic member into ultraviolet curable composition | | | | | | | |
| | Number of cleaning blade | | Number of elastic member | Number of ultraviolet curable composition | Dipping time (min) | Maximum thickness ($t_M$) (μm) | Average thickness ($t_A$) (μm) | Increasing rate (IR)* (%) | Image quality | Occurrence of eversion | Abrasion |
| Comp. Ex. 3 | 12 | 1 | 12' | 1 | 120 | 2.0800 | 2.0000 | 4.0000 | Images with 2 weak streak images | Yes | |

*Increasing rate (%) = [($t_M$ − $t_A$)/$t_A$] × 100

It is clear from Table 3 that by impregnating the tip portion of an elastic member, which is defined as a portion of from a tip surface thereof to a portion 500 μm away from the tip surface in the longitudinal direction of the elastic member, with a treatment liquid including at least a curable monomer (ultraviolet curable compositions 1-6), followed by curing, so that the increasing rate (IR), which is defined as ([($t_M$−$t_A$)/$t_A$]×100), falls in a range of from 0.05% to 2%, the resultant cleaning blades do not cause eversion of the tip edge portion and abrasion or loss thereof, and produce high quality images over a long period of time while maintaining good cleanability.

In contrast, the cleaning blade of Comparative Example 1, whose tip portion is not subjected to the impregnation and curing treatment, the cleaning blade of Comparative Example 2, which has an increasing rate (IR) of less than 0.05%, and the cleaning blade of Comparative Example 3, which has an increasing rate (IR) of greater than 2%, cause eversion of the tip edge portion and abrasion thereof, thereby deteriorating the cleanability of the cleaning blades, resulting in formation of defective images.

Therefore, it is clear that when the cleaning blade has an increasing rate (IR) in a range of from 0.05% to 2%, the cleaning blade is hardly deformed because the tip portion thereof is relatively thick compared to the rear portion thereof, and therefore does not cause eversion of the tip edge portion even when the contact pressure is increased, thereby making it possible for the cleaning blade to maintain good cleanability over a long period of time.

By using the cleaning blade for the cleaner of an image forming apparatus, the image forming apparatus can stably produce high quality images without forming abnormal images even when the cleaner is used over a long period of time.

As mentioned above, the cleaning blade of this disclosure can maintain good cleanability over a long period of time without causing the tip eversion problem.

Additional modifications and variations of the present invention are possible in light of the above teachings. It is therefore to be understood that within the scope of the appended claims the invention may be practiced other than as specifically described herein.

What is claimed is:

1. A cleaning blade comprising:
a supporting member; and
a tabular elastic member including:
    a first end portion fixed to the supporting member; and
    a second end portion, which is a free end portion not contacted with the supporting member and whose tip edge is to be contacted with a surface of a member to be cleaned while rubbing the surface of the member to be cleaned to remove a residual material from the surface of the member to be cleaned,
wherein a tip portion of the second end portion of the elastic member, which is defined as a portion ranging in length in a longitudinal direction of the elastic member from 0 to 500 μm from a tip surface of the second end portion, includes a layer composed of at least a cured material of a curable compound which has impregnated therein an elastic material of the elastic member, and
wherein the elastic member satisfies the following relationship:

$$0.05(\%) \leq [(t_M - t_A)/t_A] \times 100 \leq 2(\%),$$

wherein $t_M$ represents a maximum thickness of the tip portion of the second end portion of the elastic member, and $t_A$ represents an average thickness of a rear portion of the second end portion of the elastic member other than the tip portion.

2. The cleaning blade according to claim 1, wherein the cured material includes a cured material of at least one of an acrylate compound, and a methacrylate compound.

3. The cleaning blade according to claim 1, wherein the cured material includes an ultraviolet cured material of an ultraviolet curable composition including the curable compound.

4. The cleaning blade according to claim 1, wherein the elastic member is an integrally-molded multi-layer elastic member in which two or more rubber strips having different JIS-A hardness are laminated.

5. An image forming apparatus comprising:
an image bearer;
a charger to charge a surface of the image bearer;
an irradiator to irradiate the charged surface of the image bearer with light to form an electrostatic latent image on the surface of the image bearer;
a developing device to develop the electrostatic latent image with a developer including a toner to form a toner image on the surface of the image bearer;
a transferring device to transfer the toner image to a recording medium;
a fixing device to fix the toner image to the recording medium; and
a cleaner including the cleaning blade according to claim 1 to clean the surface of the image bearer with the cleaning blade.

6. A process cartridge comprising:
at least an image bearer; and
a cleaner including the cleaning blade according to claim 1 to clean a surface of the image bearer with the cleaning blade,
wherein the process cartridge is detachably attachable to an image forming apparatus as a single unit.

7. A cleaning blade comprising:
a supporting member; and
a tabular elastic member including:
  a first end portion fixed to the supporting member; and
  a second end portion, which is a free end portion not contacted with the supporting member and whose tip edge is to be contacted with a surface of a member to be cleaned while rubbing the surface of the member to be cleaned to remove a residual material from the surface of the member to be cleaned,
wherein a tip portion of the second end portion of the elastic member, which is defined as a portion ranging in length in a longitudinal direction of the elastic member from 0 to 500 μm from a tip surface of the second end portion, includes at least a cured material of a curable compound and an elastic material of the elastic member,
wherein the elastic member satisfies the following relationship:

$$0.05(\%) \leq [(t_M - t_A)/t_A] \times 100 \leq 2(\%),$$

wherein $t_M$ represents a maximum thickness of the tip portion of the second end portion of the elastic member, and $t_A$ represents an average thickness of a rear portion of the second end portion of the elastic member other than the tip portion, and
  wherein the cured material includes a cured material of at least one of an alicyclic acrylate compound having 6 or more carbon atoms, and an alicyclic methacrylate compound having 6 or more carbon atoms.

8. The cleaning blade according to claim 7, wherein the cured material includes a cured material of at least one of an alicyclic acrylate compound having 6 or more carbon atoms and including 2 to 6 functional groups, and an alicyclic methacrylate compound having 6 or more carbon atoms and including 2 to 6 functional groups.

9. The cleaning blade according to claim 7, wherein the cured material includes a cured material of at least one of an alicyclic acrylate compound having 6 or more carbon atoms and a molecular weight of not greater than 500, and an alicyclic methacrylate compound having 6 or more carbon atoms and a molecular weight of not greater than 500.

10. The cleaning blade according to claim 7, wherein the cured material includes a cured material of at least one of an alicyclic acrylate compound having 6 or more carbon atoms and one of a tricyclodecane structure and an adamantane structure, and an alicyclic methacrylate compound having 6 or more carbon atoms and one of a tricyclodecane structure and an adamantane structure.

11. The cleaning blade according to claim 10, wherein the cured material includes a cured material of at least one of tricyclodecane dimethanol diacrylate, and tricyclodecane dimethanol dimethacrylate.

12. The cleaning blade according to claim 10, wherein the cured material includes a cured material of at least one of 1,3-adamantane dimethanol diacrylate, 3,5-adamantane trimethanol triacrylate, 1,3-adamantane dimethanol dimethacrylate, and 1,3,5-adamantane trimethanol trimethacrylate.

13. An image forming apparatus comprising:
an image bearer;
a charger to charge a surface of the image bearer;
an irradiator to irradiate the charged surface of the image bearer with light to form an electrostatic latent image on the surface of the image bearer;
a developing device to develop the electrostatic latent image with a developer including a toner to form a toner image on the surface of the image bearer;
a transferring device to transfer the toner image to a recording medium;
a fixing device to fix the toner image to the recording medium; and
a cleaner including the cleaning blade according to claim 7 to clean the surface of the image bearer with the cleaning blade.

14. A process cartridge comprising:
at least an image bearer; and
a cleaner including the cleaning blade according to claim 7 to clean a surface of the image bearer with the cleaning blade,
wherein the process cartridge is detachably attachable to an image forming apparatus as a single unit.

* * * * *